(12) United States Patent
Liu et al.

(10) Patent No.: US 12,707,485 B2
(45) Date of Patent: Aug. 11, 2026

(54) COMMUNICATION METHOD AND APPARATUS

(71) Applicant: HUAWEI TECHNOLOGIES CO., LTD., Shenzhen (CN)

(72) Inventors: Ye Liu, Beijing (CN); Qian Zhang, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 270 days.

(21) Appl. No.: 18/641,175

(22) Filed: Apr. 19, 2024

(65) Prior Publication Data

US 2024/0276526 A1 Aug. 15, 2024

Related U.S. Application Data

(63) Continuation of application No. PCT/CN2022/118581, filed on Sep. 14, 2022.

(30) Foreign Application Priority Data

Oct. 22, 2021 (CN) ......................... 202111235354.0

(51) Int. Cl.
*H04W 72/40* (2023.01)
*H04W 52/36* (2009.01)
(Continued)

(52) U.S. Cl.
CPC ......... *H04W 72/40* (2023.01); *H04W 52/367* (2013.01); *H04W 72/0446* (2013.01); *H04W 72/566* (2023.01)

(58) Field of Classification Search
None
See application file for complete search history.

(56) References Cited

U.S. PATENT DOCUMENTS

2011/0310781 A1* 12/2011 Kim ...................... H04L 5/0046 370/328
2013/0178221 A1 7/2013 Jung et al.
(Continued)

FOREIGN PATENT DOCUMENTS

CN 110831140 A 2/2020
WO 2019194270 A1 10/2019
(Continued)

OTHER PUBLICATIONS

3GPP TS 38.101-1 V17.3.0, “3rd Generation Partnership Project; Technical Specification Group Radio Access Network; NR; User Equipment (UE) radio transmission and reception; Part 1: Range 1 Standalone; (Release 17),” Sep. 2021, 580 pages.
(Continued)

*Primary Examiner* — Suhail Khan
(74) *Attorney, Agent, or Firm* — Fish & Richardson P.C.

(57) ABSTRACT

A method includes: determining whether a first uplink transmission resource overlaps a first sidelink transmission resource in time domain; when the first uplink transmission resource overlaps the first sidelink transmission resource in time domain, determining a first configured maximum output power based on a first maximum power reduction, where the first maximum power reduction is a maximum power reduction corresponding to a con-current mode; and determining a transmitted power for a first uplink transmission and a transmitted power for a first sidelink transmission based on the first configured maximum output power.

20 Claims, 4 Drawing Sheets

(51) Int. Cl.

| | |
|---|---|
| ***H04W 72/0446*** | (2023.01) |
| ***H04W 72/566*** | (2023.01) |

(56) References Cited

U.S. PATENT DOCUMENTS

| | | | |
|---|---|---|---|
| 2019/0098580 | A1 | 3/2019 | Babaei et al. |
| 2021/0329568 | A1 | 10/2021 | Zhang |

FOREIGN PATENT DOCUMENTS

| | | | |
|---|---|---|---|
| WO | 2021016638 | A1 | 1/2021 |
| WO | 2021031090 | A1 | 2/2021 |
| WO | 2021126811 | A1 | 6/2021 |

OTHER PUBLICATIONS

3GPP TS 38.101-3 V17.3.0, "3rd Generation Partnership Project; Technical Specification Group Radio Access Network; NR; User Equipment (UE) radio transmission and reception; Part 3: Range 1 and Range 2 Interworking operation with other radios; (Release 17)," Sep. 2021, 846 pages.

3GPP TS 38.331 V16.6.0, "3rd Generation Partnership Project; Technical Specification Group Radio Access Network; NR; Radio Resource Control (RRC) protocol specification; (Release 16)," Sep. 2021, 961 pages.

CATT, "WF on operating scenarios for SL and Uu in the same licensed band," 3GPP TSG-RAN WG4 Meeting #98-bis-e, R4-2105403, Electronic Meeting, Apr. 12-20, 2021, 9 pages.

CATT, "WF on operating scenarios for Uu and SL. operating in the same licensed band." 3GPP TSG-RAN WG4 Meeting #99-e, R4-2107868, Electronic Meeting, May 19-27, 2021, 10 pages.

Xiaomi, "CR for TS 38.101-3 switching period for V2X con-current operation," 3GPP TSG-RAN WG4 Meeting #100-e, R4-2112602, Electronic Meeting, Aug. 16-27, 2021, 2 pages.

International Search Report and Written Opinion in International Appln. No. PCT/CN2022/118581, mailed on Nov. 30, 2022, 15 pages (with English translation).

3GPP TS 38.101-1 V16.8.0, "3rd Generation Partnership Project; Technical Specification Group Radio Access Network; NR; User Equipment (UE) radio transmission and reception; Part 1: Range 1 Standalone (Release 16)," Jun. 2021, 410 pages.

Extended European Search Report in European Appln. No. 22882503.0, mailed on Jan. 14, 2025, 10 pages.

3GPP TS 38.101-1 V16.8.0, 3rd Generation Partnership Project; Technical Specification Group Radio Access Network; NR; User Equipment (UE) radio transmission and reception; Part 1: Range 1 Standalone (Release 16), Jun. 2021, 405 pages.

* cited by examiner (a)

(b)

(c)

COMMUNICATION METHOD AND APPARATUS

CROSS-REFERENCE TO RELATED APPLICATIONS

This application is a continuation of International Application No. PCT/CN2022/118581, filed on Sep. 14, 2022, which claims priority to Chinese Patent Application No. 202111235354.0, filed on Oct. 22, 2021. The disclosures of the aforementioned applications are hereby incorporated by reference in their entireties.

TECHNICAL FIELD

Embodiments of this disclosure relate to the communication field, and more specifically, to a communication method and apparatus.

BACKGROUND

To improve security of user equipment in an application scenario of the internet of vehicles, a latency of communication between user equipments in the scenario needs to be reduced. A 3rd Generation Partnership Project (3rd Generation Partnership Project, 3GPP) network proposes an internet of vehicles technology of vehicle to everything (vehicle to everything, V2X) communication in a long term evolution (long term evolution, LTE) system.

The V2X communication is intended for high-speed devices represented by vehicles, and is a basic and key technology to be used in future scenarios that have a quite high communication latency requirement, such as scenarios of intelligent vehicles, autonomous driving, and intelligent transportation systems. LTE V2X communication can support communication scenarios with network coverage and communication scenarios without network coverage, and a resource allocation manner in the LTE V2X communication may be a network access device scheduling mode, for example, an evolved universal terrestrial radio access network NodeB (E-UTRAN NodeB, eNB) scheduling mode, and a UE autonomous-selection mode. Based on the V2X technology, vehicle user equipment (Vehicle UE, V-UE) can send some information of the vehicle user equipment to surrounding V-UE, for example, send information such as a location, a speed, and an intention (turning, paralleling, or reversing) periodically, and send information triggered by some aperiodic events. Similarly, the V-UE also receives information from a surrounding user in real time.

With development of 5G NR technologies in the 3GPP standards organization, 5G NR V2X further develops. For example, the 5G NR V2X can support a lower transmission latency, a more reliable communication transmission, a higher throughput, and better user experience, to meet wider application scenario requirements.

SUMMARY

Embodiments of this disclosure provide a communication method and apparatus, to flexibly determine an appropriate configured maximum output power, and appropriately determine a transmitted power for an uplink transmission and/or a transmitted power for a sidelink transmission, so as to improve a communication success rate.

According to a first aspect, a communication method is provided, including: A first apparatus receives first indication information from a network device, where the first indication information indicates a first uplink transmission resource; the first apparatus determines whether the first uplink transmission resource overlaps a first sidelink transmission resource in time domain; when the first uplink transmission resource overlaps the first sidelink transmission resource in time domain, the first apparatus determines a first configured maximum output power based on a first maximum power reduction, where the first maximum power reduction is a maximum power reduction corresponding to a con-current mode; and the first apparatus determines a transmitted power for a first uplink transmission and a transmitted power for a first sidelink transmission based on the first configured maximum output power, where a sum of the transmitted power for the first uplink transmission and the transmitted power for the first sidelink transmission does not exceed the first configured maximum output power, the first uplink transmission is carried on the first uplink transmission resource, and the first sidelink transmission is carried on the first sidelink transmission resource.

It should be understood that the first apparatus may be a terminal, or may be a combined device or component having a function of a terminal, or may be a communication chip (for example, a processor, a baseband chip, or a chip system) used in a terminal.

In the first aspect, when the first uplink transmission resource overlaps the first sidelink transmission resource in time domain, the first apparatus determines the configured maximum output power by using the maximum power reduction corresponding to the con-current mode, and determines the transmitted power for the uplink transmission and the transmitted power for the sidelink transmission based on the configured maximum output power in the con-current mode, so that a transmission power in the con-current mode can meet spectrum indicators corresponding to a spurious emission, a spectrum emission mask, and the like, and communication quality and a success rate are improved.

In the foregoing implementation, when the first uplink transmission resource overlaps the first sidelink transmission resource, the first apparatus determines an appropriate configured maximum output power in the con-current mode, so that communication quality can be effectively improved, and a communication success rate can be effectively improved.

With reference to the first aspect, in some implementations of the first aspect, the method further includes: When the first uplink transmission resource does not overlap the first sidelink transmission resource in time domain, the first apparatus determines the first configured maximum output power based on the first maximum power reduction; and the first apparatus determines the transmitted power for the first uplink transmission or the transmitted power for the first sidelink transmission based on the first configured maximum output power, where the transmitted power for the first uplink transmission or the transmitted power for the first sidelink transmission does not exceed the first configured maximum output power.

With reference to the first aspect, in some implementations of the first aspect, the method further includes: When the first uplink transmission resource does not overlap the first sidelink transmission resource in time domain, the first apparatus determines a second configured maximum output power based on a second maximum power reduction, where the second maximum power reduction is a maximum power reduction corresponding to a carrier on which the first uplink transmission resource is located, and the first apparatus determines the transmitted power for the first uplink transmission based on the second configured maximum output power, where the transmitted power for the first uplink transmission does not exceed the second configured maximum output power; or the first apparatus determines a third configured maximum output power based on a third maximum power reduction, where the third maximum power reduction is a maximum power reduction corresponding to a carrier on which the first sidelink transmission resource is located, and the first apparatus determines the transmitted power for the first sidelink transmission based on the third configured maximum output power, where the transmitted power for the first sidelink transmission does not exceed the third configured maximum output power.

In this implementation, when the uplink transmission resource does not overlap the sidelink transmission resource, the first apparatus determines the respective configured maximum output powers by using the maximum power reductions corresponding to the respective transmissions, to determine a transmitted power for each transmission. This reduces a problem that communication quality deteriorates and a communication success rate decreases due to an excessively large maximum power reduction in a scenario in which transmission resources do not overlap in time domain.

In the foregoing implementation, when the first uplink transmission resource does not overlap the first sidelink transmission resource, the first apparatus flexibly determines an appropriate configured maximum output power, so that communication quality of the first apparatus can be effectively improved, and a communication success rate can be effectively improved.

With reference to the first aspect, in some implementations of the first aspect, when the first uplink transmission resource overlaps the first sidelink transmission resource in time domain, and a priority of the first uplink transmission is higher than a priority of the first sidelink transmission, that the first apparatus determines a transmitted power for a first uplink transmission and a transmitted power for a first sidelink transmission based on the first configured maximum output power includes: The first apparatus determines the transmitted power for the first uplink transmission, where the transmitted power for the first uplink transmission is a smaller value between the transmitted power for the first uplink transmission and the first configured maximum output power, the transmitted power for the first uplink transmission is determined based on a second maximum power reduction, and the second maximum power reduction is a maximum power reduction corresponding to a carrier on which the first uplink transmission resource is located; and the first apparatus determines the transmitted power for the first sidelink transmission based on the first configured maximum output power and the transmitted power for the first uplink transmission.

In the foregoing implementation, the first apparatus may consider priorities of overlapped transmission resources, and preferentially determine a transmitted power for a transmission with a higher priority, to ensure a success rate of the transmission with a higher priority, to further improve communication quality.

With reference to the first aspect, in some implementations of the first aspect, when the first uplink transmission resource overlaps the first sidelink transmission resource in time domain, that the first apparatus determines a transmitted power for a first uplink transmission and a transmitted power for a first sidelink transmission based on the first configured maximum output power includes: The first apparatus determines the transmitted power for the first sidelink transmission, where the transmitted power for the first sidelink transmission is a smaller value between the transmitted power for the first sidelink transmission and the first configured maximum output power, the transmitted power for the first sidelink transmission is determined based on a third maximum power reduction, and the third maximum power reduction is a maximum power reduction corresponding to a carrier on which the first sidelink transmission resource is located; and the first apparatus determines the transmitted power for the first uplink transmission based on the first configured maximum output power and the transmitted power for the first sidelink transmission.

In the foregoing implementation, the first apparatus may consider priorities of overlapped transmission resources, and preferentially determine a transmitted power for a transmission with a higher priority, to ensure a success rate of the transmission with a higher priority, to further improve communication quality.

With reference to the first aspect, in some implementations of the first aspect, the first maximum power reduction is determined based on the first uplink transmission resource and the first sidelink transmission resource.

With reference to the first aspect, in some implementations of the first aspect, the method further includes: The first apparatus receives second indication information from the network device, where the second indication information indicates a second uplink transmission resource; when the second uplink transmission resource overlaps the first sidelink transmission resource in time domain, the first apparatus determines a fourth configured maximum output power based on a fourth maximum power reduction, where the fourth maximum power reduction is a maximum power reduction corresponding to the con-current mode, and the fourth maximum power reduction is determined based on the second uplink transmission resource and the first sidelink transmission resource; and when the fourth configured maximum output power is greater than the first configured maximum output power, the first apparatus determines a transmitted power for a second uplink transmission based on the first configured maximum output power, where a sum of the transmitted power for the second uplink transmission and the transmitted power for the first sidelink transmission does not exceed the first configured maximum output power, and the second uplink transmission is carried on the second uplink transmission resource.

It should be understood that, when one sidelink transmission resource overlaps a plurality of uplink transmission resources, a plurality of configured maximum output powers are determined based on a maximum power reduction that is determined based on the sidelink transmission resource and each uplink transmission resource, and a minimum value in the plurality of configured maximum output powers is determined as the configured maximum output power for the first apparatus.

In the foregoing implementation, when one sidelink transmission resource overlaps a plurality of uplink transmission resources, in a plurality of time domain resources in which the sidelink transmission resource overlaps the plurality of uplink transmission resources, it can be ensured that a spectrum indicator of a spurious emission meets a requirement, and communication quality can be further improved.

With reference to the first aspect, in some implementations of the first aspect, the method further includes: The first apparatus determines at least one second sidelink transmission resource; when the second sidelink transmission resource overlaps the first uplink transmission resource in time domain, the first apparatus determines a fifth configured maximum output power based on a fifth maximum power reduction, where the fifth maximum power reduction is a maximum power reduction corresponding to the con-current mode, and the fifth maximum power reduction is determined based on the second sidelink transmission resource and the first uplink transmission resource; and when the fifth configured maximum output power is greater than the first configured maximum output power, the first apparatus determines a transmitted power for a second sidelink transmission based on the first configured maximum output power, where a sum of the transmitted power for the second sidelink transmission and the transmitted power for the first uplink transmission does not exceed the first configured maximum output power, and the second sidelink transmission is carried on the second sidelink transmission resource.

It should be understood that, when one uplink transmission resource overlaps a plurality of sidelink transmission resources, a plurality of configured maximum output powers are determined based on a maximum power reduction that is determined based on the uplink transmission resource and each sidelink transmission resource, and a minimum value in the plurality of configured maximum output powers is determined as the configured maximum output power for the first apparatus.

In the foregoing implementation, when one uplink transmission resource overlaps a plurality of sidelink transmission resources, in a plurality of time domain resources in which the uplink transmission resource overlaps the plurality of sidelink transmission resources, it can be ensured that a spectrum indicator of a spurious emission meets a requirement, and communication quality can be further improved.

With reference to the first aspect, in some implementations of the first aspect, the first uplink transmission resource and the first sidelink transmission resource are located in a same frequency band.

According to a second aspect, a communication method is provided, including: A first apparatus receives first indication information from a network device, where the first indication information indicates a first uplink transmission resource; the first apparatus receives second indication information from the network device, where the second indication information indicates a second uplink transmission resource; the first apparatus determines whether the first uplink transmission resource overlaps the second uplink transmission resource in time domain; when the first uplink transmission resource overlaps the second uplink transmission resource in time domain, the first apparatus determines a first configured maximum output power based on a first maximum power reduction, where the first maximum power reduction is a maximum power reduction corresponding to a con-current mode; and the first apparatus determines a transmitted power for a first uplink transmission and a transmitted power for a second uplink transmission based on the first configured maximum output power, where a sum of the transmitted power for the first uplink transmission and the transmitted power for the second uplink transmission does not exceed the first configured maximum output power, the first uplink transmission is carried on the first uplink transmission resource, and the second uplink transmission is carried on the second uplink transmission resource.

It should be understood that the first apparatus may be a terminal, or may be a combined device or component having a function of a terminal, or may be a communication chip (for example, a processor, a baseband chip, or a chip system) used in a terminal.

In the second aspect, when the first uplink transmission resource overlaps the second uplink transmission resource in time domain, the first apparatus determines the configured maximum output power by using the maximum power reduction corresponding to the con-current mode, and determines the transmitted power for the uplink transmission and the transmitted power for the sidelink transmission based on the configured maximum output power in the con-current mode, so that a transmission power in the con-current mode can meet spectrum indicators corresponding to a spurious emission, a spectrum emission mask, and the like, and communication quality and a success rate are improved.

In the foregoing implementation, when the first uplink transmission resource overlaps the second uplink transmission resource, the first apparatus determines an appropriate configured maximum output power in the con-current mode, so that communication quality can be effectively improved, and a communication success rate can be effectively improved.

With reference to the second aspect, in some implementations of the second aspect, the method further includes: When the first uplink transmission resource does not overlap the second uplink transmission resource in time domain, the first apparatus determines the first configured maximum output power based on the first maximum power reduction; and the first apparatus determines the transmitted power for the first uplink transmission or the transmitted power for the second uplink transmission based on the first configured maximum output power, where the transmitted power for the first uplink transmission or the transmitted power for the second uplink transmission does not exceed the first configured maximum output power.

With reference to the second aspect, in some implementations of the second aspect, the method further includes: When the first uplink transmission resource does not overlap the second uplink transmission resource in time domain, the first apparatus determines a second configured maximum output power based on a second maximum power reduction, where the second maximum power reduction is a maximum power reduction corresponding to a carrier on which the first uplink transmission resource is located, and the first apparatus determines the transmitted power for the first uplink transmission based on the second configured maximum output power, where the transmitted power for the first uplink transmission does not exceed the second configured maximum output power; or the first apparatus determines a third configured maximum output power based on a third maximum power reduction, where the third maximum power reduction is a maximum power reduction corresponding to a carrier on which the second uplink transmission resource is located, and the first apparatus determines the transmitted power for the second uplink transmission based on the third configured maximum output power, where the transmitted power for the second uplink transmission does not exceed the third configured maximum output power.

In this implementation, when the first uplink transmission resource does not overlap the second uplink transmission resource, the first apparatus determines the respective configured maximum output powers by using the maximum power reductions corresponding to the respective transmissions, to determine a transmitted power for each transmission. This reduces a problem that communication quality deteriorates and a communication success rate decreases due to an excessively large maximum power reduction in a scenario in which transmission resources do not overlap in time domain.

In the foregoing implementation, when the first uplink transmission resource does not overlap the second uplink transmission resource, the first apparatus flexibly determines an appropriate configured maximum output power, so that communication quality of the first apparatus can be effectively improved, and a communication success rate can be effectively improved.

According to a third aspect, a communication method is provided, including: A first apparatus receives first indication information from a network device, where the first indication information indicates an uplink transmission resource; the first apparatus determines a sidelink transmission resource; the first apparatus determines a first configured maximum output power based on a first maximum power reduction, where the first maximum power reduction is a maximum power reduction corresponding to a con-current mode; and the first apparatus determines a transmitted power for an uplink transmission and a transmitted power for a sidelink transmission based on the first configured maximum output power, where a sum of the transmitted power for the uplink transmission and the transmitted power for the sidelink transmission does not exceed the first configured maximum output power, the uplink transmission is carried on the uplink transmission resource, and the sidelink transmission is carried on the sidelink transmission resource.

It should be understood that the first apparatus may be a terminal, or may be a combined device or component having a function of a terminal, or may be a communication chip (for example, a processor, a baseband chip, or a chip system) used in a terminal.

In the third aspect, because there is a possibility that the sidelink transmission resource overlaps the uplink transmission resource, the configured maximum output power is determined by using the maximum power reduction corresponding to the con-current mode, and the transmitted power for the uplink transmission and the transmitted power for the sidelink transmission are determined based on the configured maximum output power in the con-current mode, so that a transmission power can meet spectrum indicators corresponding to a spurious emission, a spectrum emission mask, and the like, and communication quality and a success rate are improved.

In the foregoing implementation, when the uplink transmission resource may overlap the sidelink transmission resource, the first apparatus flexibly determines an appropriate configured maximum output power, so that communication quality can be effectively improved, and a communication success rate can be effectively improved.

According to a fourth aspect, a communication apparatus is provided, including: a transceiver module, configured to receive first indication information from a network device, where the first indication information indicates a first uplink transmission resource; and a processing module, configured to determine whether the first uplink transmission resource overlaps a first sidelink transmission resource in time domain. When the first uplink transmission resource overlaps the first sidelink transmission resource in time domain, the processing module is further configured to determine a first configured maximum output power based on a first maximum power reduction, where the first maximum power reduction is a maximum power reduction corresponding to a con-current mode; and the processing module is further configured to determine a transmitted power for a first uplink transmission and a transmitted power for a first sidelink transmission based on the first configured maximum output power, where a sum of the transmitted power for the first uplink transmission and the transmitted power for the first sidelink transmission does not exceed the first configured maximum output power, the first uplink transmission is carried on the first uplink transmission resource, and the first sidelink transmission is carried on the first sidelink transmission resource.

In the fourth aspect, when the first uplink transmission resource overlaps the first sidelink transmission resource in time domain, the first apparatus determines the configured maximum output power by using the maximum power reduction corresponding to the con-current mode, and determines the transmitted power for the uplink transmission and the transmitted power for the sidelink transmission based on the configured maximum output power in the con-current mode, so that a transmission power in the con-current mode can meet spectrum indicators corresponding to a spurious emission, a spectrum emission mask, and the like, and communication quality and a success rate are improved.

In the foregoing implementation, when the first uplink transmission resource overlaps the first sidelink transmission resource, the first apparatus determines an appropriate configured maximum output power in the con-current mode, so that communication quality can be effectively improved, and a communication success rate can be effectively improved.

With reference to the fourth aspect, in some implementations of the fourth aspect, when the first uplink transmission resource does not overlap the first sidelink transmission resource in time domain, the processing module is further configured to determine the first configured maximum output power based on the first maximum power reduction; and the processing module is further configured to determine the transmitted power for the first uplink transmission or the transmitted power for the first sidelink transmission based on the first configured maximum output power, where the transmitted power for the first uplink transmission or the transmitted power for the first sidelink transmission does not exceed the first configured maximum output power.

With reference to the fourth aspect, in some implementations of the fourth aspect, the processing module is further configured to determine a second configured maximum output power based on a second maximum power reduction, where the second maximum power reduction is a maximum power reduction corresponding to a carrier on which the first uplink transmission resource is located, and the processing module is further configured to determine the transmitted power for the first uplink transmission based on the second configured maximum output power, where the transmitted power for the first uplink transmission does not exceed the second configured maximum output power; or the processing module is further configured to determine a third configured maximum output power based on a third maximum power reduction, where the third maximum power reduction is a maximum power reduction corresponding to a carrier on which the first sidelink transmission resource is located, and the processing module is further configured to determine the transmitted power for the first sidelink transmission based on the third configured maximum output power, where the transmitted power for the first sidelink transmission does not exceed the third configured maximum output power.

In this implementation, when the uplink transmission resource does not overlap the sidelink transmission resource, the first apparatus determines the respective configured maximum output powers by using the maximum power reductions corresponding to the respective transmissions, to determine a transmitted power for each transmission. This reduces a problem that communication quality deteriorates and a communication success rate decreases due to an excessively large maximum power reduction in a scenario in which transmission resources do not overlap in time domain.

In the foregoing implementation, when the first uplink transmission resource does not overlap the first sidelink transmission resource, the first apparatus flexibly determines an appropriate configured maximum output power, so that communication quality of the first apparatus can be effectively improved, and a communication success rate can be effectively improved.

With reference to the fourth aspect, in some implementations of the fourth aspect, when the first uplink transmission resource overlaps the first sidelink transmission resource in time domain, and a priority of the first uplink transmission is higher than a priority of the first sidelink transmission, the processing module is specifically configured to determine the transmitted power for the first uplink transmission, where the transmitted power for the first uplink transmission is a smaller value between the transmitted power for the first uplink transmission and the first configured maximum output power, the transmitted power for the first uplink transmission is determined based on a second maximum power reduction, and the second maximum power reduction is a maximum power reduction corresponding to a carrier on which the first uplink transmission resource is located; and the processing module is specifically configured to determine the transmitted power for the first sidelink transmission based on the first configured maximum output power and the transmitted power for the first uplink transmission.

In the foregoing implementation, the first apparatus may consider priorities of overlapped transmission resources, and preferentially determine a transmitted power for a transmission with a higher priority, to ensure a success rate of the transmission with a higher priority, to further improve communication quality.

With reference to the fourth aspect, in some implementations of the fourth aspect, when the first uplink transmission resource overlaps the first sidelink transmission resource in time domain, and a priority of the first sidelink transmission is higher than a priority of the first uplink transmission, the processing module is specifically configured to determine the transmitted power for the first sidelink transmission, where the transmitted power for the first sidelink transmission is a smaller value between the transmitted power for the first sidelink transmission and the first configured maximum output power, the transmitted power for the first sidelink transmission is determined based on a third maximum power reduction, and the third maximum power reduction is a maximum power reduction corresponding to a carrier on which the first sidelink transmission resource is located; and the processing module is specifically configured to determine the transmitted power for the first uplink transmission based on the first configured maximum output power and the transmitted power for the first sidelink transmission.

In the foregoing implementation, the first apparatus may consider priorities of overlapped transmission resources, and preferentially determine a transmitted power for a transmission with a higher priority, to ensure a success rate of the transmission with a higher priority, to further improve communication quality.

With reference to the fourth aspect, in some implementations of the fourth aspect, the first maximum power reduction is determined based on the first uplink transmission resource and the first sidelink transmission resource.

With reference to the fourth aspect, in some implementations of the fourth aspect, the transceiver module is further configured to receive second indication information from the network device, where the second indication information indicates a second uplink transmission resource; when the second uplink transmission resource overlaps the first sidelink transmission resource in time domain, the processing module is further configured to determine a fourth configured maximum output power based on a fourth maximum power reduction, where the fourth maximum power reduction is a maximum power reduction corresponding to the con-current mode, and the fourth maximum power reduction is determined based on the second uplink transmission resource and the first sidelink transmission resource; and when the fourth configured maximum output power is greater than the first configured maximum output power, the processing module is further configured to determine a transmitted power for a second uplink transmission based on the first configured maximum output power, where a sum of the transmitted power for the second uplink transmission and the transmitted power for the first sidelink transmission does not exceed the first configured maximum output power, and the second uplink transmission is carried on the second uplink transmission resource.

It should be understood that, when one sidelink transmission resource overlaps a plurality of uplink transmission resources, a plurality of configured maximum output powers are determined based on a maximum power reduction that is determined based on the sidelink transmission resource and each uplink transmission resource, and a minimum value in the plurality of configured maximum output powers is determined as the configured maximum output power for the first apparatus.

In the foregoing implementation, when one sidelink transmission resource overlaps a plurality of uplink transmission resources, in a plurality of time domain resources in which the sidelink transmission resource overlaps the plurality of uplink transmission resources, it can be ensured that a spectrum indicator of a spurious emission meets a requirement, and communication quality can be further improved.

With reference to the fourth aspect, in some implementations of the fourth aspect, the first apparatus determines at least one second sidelink transmission resource; when the second sidelink transmission resource overlaps the first uplink transmission resource in time domain, the processing module is further configured to determine a fifth configured maximum output power based on a fifth maximum power reduction, where the fifth maximum power reduction is a maximum power reduction corresponding to the con-current mode, and the fifth maximum power reduction is determined based on the second sidelink transmission resource and the first uplink transmission resource; and when the fifth configured maximum output power is greater than the first configured maximum output power, the processing module is further configured to determine a transmitted power for a second sidelink transmission based on the first configured maximum output power, where a sum of the transmitted power for the second sidelink transmission and the transmitted power for the first uplink transmission does not exceed the first configured maximum output power, and the second sidelink transmission is carried on the second sidelink transmission resource.

It should be understood that, when one uplink transmission resource overlaps a plurality of sidelink transmission resources, a plurality of configured maximum output powers are determined based on a maximum power reduction that is determined based on the uplink transmission resource and each sidelink transmission resource, and a minimum value in the plurality of configured maximum output powers is determined as the configured maximum output power for the first apparatus.

In the foregoing implementation, when one uplink transmission resource overlaps a plurality of sidelink transmission resources, in a plurality of time domain resources in which the uplink transmission resource overlaps the plurality of sidelink transmission resources, it can be ensured that a spectrum indicator of a spurious emission meets a requirement, and communication quality can be further improved.

With reference to the fourth aspect, in some implementations of the fourth aspect, the first uplink transmission resource and the first sidelink transmission resource are located in a same frequency band.

According to a fifth aspect, a communication apparatus is provided, including:

- a transceiver module, configured to receive first indication information from a network device, where the first indication information indicates a first uplink transmission resource, the transceiver module is further configured to receive second indication information from the network device, and the second indication information indicates a second uplink transmission resource; and a processing module, configured to determine whether the first uplink transmission resource overlaps the second uplink transmission resource in time domain, where when the first uplink transmission resource overlaps the second uplink transmission resource in time domain, the processing module is further configured to determine a first configured maximum output power based on a first maximum power reduction, where the first maximum power reduction is a maximum power reduction corresponding to a con-current mode; and the processing module is further configured to determine a transmitted power for a first uplink transmission and a transmitted power for a second uplink transmission based on the first configured maximum output power, where a sum of the transmitted power for the first uplink transmission and the transmitted power for the second uplink transmission does not exceed the first configured maximum output power, the first uplink transmission is carried on the first uplink transmission resource, and the second uplink transmission is carried on the second uplink transmission resource.

It should be understood that the first apparatus may be a terminal, or may be a combined device or component having a function of a terminal, or may be a communication chip (for example, a processor, a baseband chip, or a chip system) used in a terminal.

In the fifth aspect, when the first uplink transmission resource overlaps the second uplink transmission resource in time domain, the first apparatus determines the configured maximum output power by using the maximum power reduction corresponding to the con-current mode, and determines the transmitted power for the uplink transmission and the transmitted power for the sidelink transmission based on the configured maximum output power in the con-current mode, so that a transmission power in the con-current mode can meet spectrum indicators corresponding to a spurious emission, a spectrum emission mask, and the like, and communication quality and a success rate are improved.

In the foregoing implementation, when the first uplink transmission resource overlaps the second uplink transmission resource, the first apparatus determines an appropriate configured maximum output power in the con-current mode, so that communication quality can be effectively improved, and a communication success rate can be effectively improved.

With reference to the fifth aspect, in some implementations of the fifth aspect, when the first uplink transmission resource does not overlap the second uplink transmission resource in time domain, the processing module is further configured to determine the first configured maximum output power based on the first maximum power reduction; and the processing module is further configured to determine the transmitted power for the first uplink transmission or the transmitted power for the second uplink transmission based on the first configured maximum output power, where the transmitted power for the first uplink transmission or the transmitted power for the second uplink transmission does not exceed the first configured maximum output power.

With reference to the fifth aspect, in some implementations of the fifth aspect, when the first uplink transmission resource does not overlap the second uplink transmission resource in time domain, the processing module is further configured to determine a second configured maximum output power based on a second maximum power reduction, where the second maximum power reduction is a maximum power reduction corresponding to a carrier on which the first uplink transmission resource is located. The processing module is further configured to determine the transmitted power for the first uplink transmission based on the second configured maximum output power, where the transmitted power for the first uplink transmission does not exceed the second configured maximum output power. Alternatively, the processing module is further configured to determine a third configured maximum output power based on a third maximum power reduction, where the third maximum power reduction is a maximum power reduction corresponding to a carrier on which the second uplink transmission resource is located, and the processing module is further configured to determine the transmitted power for the second uplink transmission based on the third configured maximum output power, where the transmitted power for the second uplink transmission does not exceed the third configured maximum output power.

In this implementation, when the first uplink transmission resource does not overlap the second uplink transmission resource, the first apparatus determines the respective configured maximum output powers by using the maximum power reductions corresponding to the respective transmissions, to determine a transmitted power for each transmission. This reduces a problem that communication quality deteriorates and a communication success rate decreases due to an excessively large maximum power reduction in a scenario in which transmission resources do not overlap in time domain.

In the foregoing implementation, when the first uplink transmission resource does not overlap the second uplink transmission resource, the first apparatus flexibly determines an appropriate configured maximum output power, so that communication quality of the first apparatus can be effectively improved, and a communication success rate can be effectively improved.

According to a sixth aspect, a communication apparatus is provided, including: A first apparatus receives first indication information from a network device, where the first indication information indicates an uplink transmission resource; the first apparatus determines a sidelink transmission resource; the first apparatus determines a first configured maximum output power based on a first maximum power reduction, where the first maximum power reduction is a maximum power reduction corresponding to a con-current mode; and the first apparatus determines a transmitted power for an uplink transmission and a transmitted power for a sidelink transmission based on the first configured maximum output power, where a sum of the transmitted power for the uplink transmission and the transmitted power for the sidelink transmission does not exceed the first configured maximum output power, the uplink transmission is carried on the uplink transmission resource, and the sidelink transmission is carried on the sidelink transmission resource.

It should be understood that the first apparatus may be a terminal, or may be a combined device or component having a function of a terminal, or may be a communication chip (for example, a processor, a baseband chip, or a chip system) used in a terminal.

In the sixth aspect, because there is a possibility that the sidelink transmission resource overlaps the uplink transmission resource, the configured maximum output power is determined by using the maximum power reduction corresponding to the con-current mode, and the transmitted power for the uplink transmission and the transmitted power for the sidelink transmission are determined based on the configured maximum output power in the con-current mode, so that a transmission power can meet spectrum indicators corresponding to a spurious emission, a spectrum emission mask, and the like, and communication quality and a success rate are improved.

In the foregoing implementation, when the uplink transmission resource may overlap the sidelink transmission resource, the first apparatus flexibly determines an appropriate configured maximum output power, so that communication quality can be effectively improved, and a communication success rate can be effectively improved.

The communication apparatus in each of the foregoing aspects may be a terminal, or may be a chip used in a terminal, or may be another combined device, component, or the like that can implement a function of a terminal. When the communication apparatus is a terminal device, the transceiver module may be a transmitter and a receiver, or an integrated transceiver, and may include an antenna, a radio frequency circuit, and the like. The processing module may be a processor, for example, a baseband chip. When the communication apparatus is a component having a function of the terminal, the transceiver module may be a radio frequency unit, and the processing module may be a processor. When the communication apparatus is a chip system, the transceiver module may be an input/output interface of the chip system, and the processing module may be a processor in the chip system, for example, a central processing unit (central processing unit, CPU).

According to a seventh aspect, a communication apparatus is provided, including one or more processors. The one or more processors are coupled to a memory, and may be configured to execute a program or instructions in the memory, so that the apparatus performs the method in any one of the foregoing aspects or the possible implementations of the aspects. Optionally, the apparatus further includes the memory. Optionally, the apparatus further includes a communication interface, and the processor is coupled to the communication interface.

According to an eighth aspect, a processing apparatus is provided. The processing apparatus includes a processor and an input/output interface. For example, the processing apparatus is applied to a communication apparatus, and is configured to implement the functions or methods in the first aspect to the third aspect. The processing apparatus may be, for example, a chip system. In a feasible implementation, the chip system further includes a memory, and the memory is configured to store program instructions and data that are necessary for implementing functions of the method according to the first aspect.

The chip system in the foregoing aspect may be a system on chip (system on chip, SOC), a baseband chip, or the like. The baseband chip may include a processor, a channel encoder, a digital signal processor, a modem, an interface module, and the like.

In a specific implementation process, an input signal received by an input interface may be received and input by, for example, but is not limited to, a receiver, and a signal output by an output interface may be output to, for example, but is not limited to, a transmitter and transmitted by the transmitter. In addition, the input interface and the output interface may be an integrated same interface, and the interface is separately used as an input interface and an output interface at different moments. Specific implementations of the processor and various interfaces are not limited in embodiments of this disclosure.

According to a ninth aspect, a computer-readable storage medium is provided. The computer-readable storage medium stores a computer program, and when the computer program is run on a computer, the computer is enabled to perform the communication method according to any one of the first aspect to the third aspect.

According to a tenth aspect, a computer program product is provided. The computer program product includes a computer program (which may alternatively be referred to as code or instructions). When the computer program is run, a computer is enabled to perform the method according to any one of the foregoing aspects or the possible implementations of the aspects.

According to an eleventh aspect, a chip system is provided, including: a processor, configured to invoke a computer program from a memory and run the computer program, so that a communication device on which the chip system is installed performs the communication method according to any one of the first aspect to the third aspect.

DESCRIPTION OF EMBODIMENTS

The following describes technical solutions of embodiments in this disclosure with reference to accompanying drawings.

The technical solutions in embodiments of this disclosure may be applied to various communication systems, for example, a long term evolution (long term evolution, LTE) system, an LTE frequency division duplex (frequency division duplex, FDD) system, an LTE time division duplex (time division duplex, TDD) system, a worldwide interoperability for microwave access (worldwide interoperability for microwave access, WiMAX) communication system, a new radio (new radio, NR) system, another future evolved wireless communication system, or the like.

Figures 1, 2:
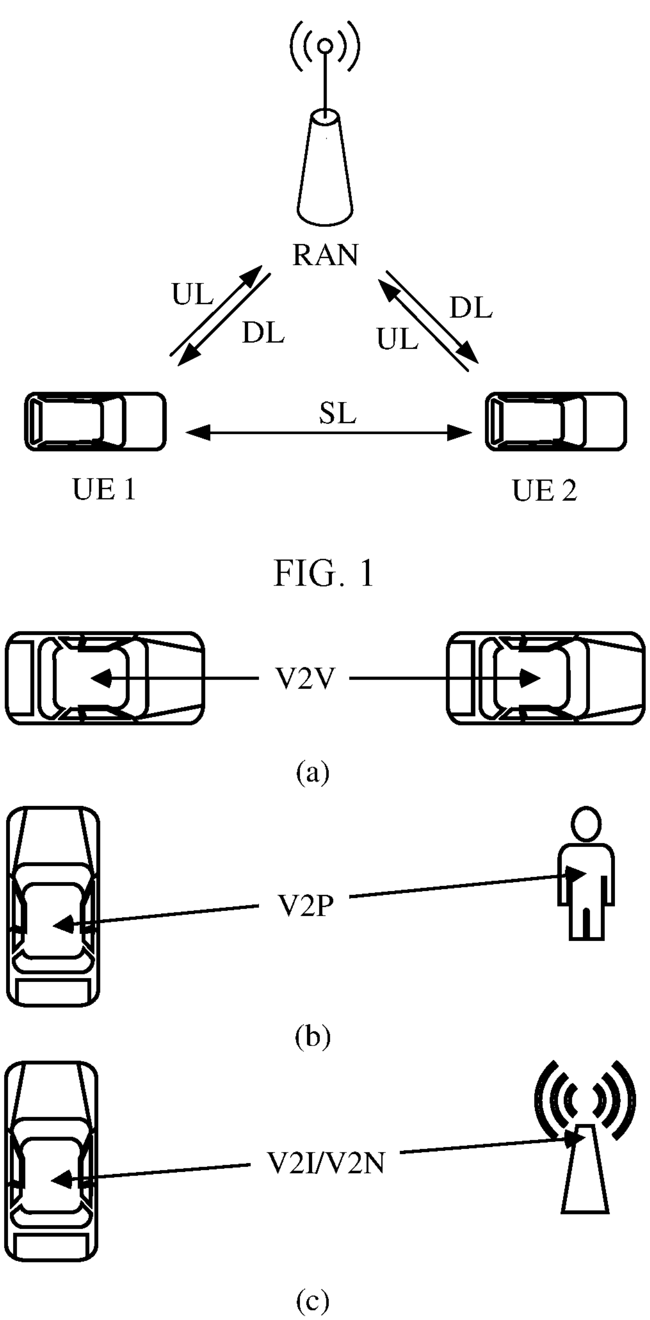
FIG. 1 is a schematic diagram of a communication architecture according to an embodiment of this disclosure.
FIG. 2 shows several possible internet of vehicles communication scenarios.

FIG. 1 is a schematic diagram of a communication architecture according to an embodiment of this disclosure. As shown in FIG. 1, a communication system in this disclosure includes at least one network device and two user equipments. V2X communication scenarios are used as examples. V2X communication may support communication scenarios with network coverage and communication scenarios without network coverage. In the communication scenario with network coverage, the network device may communicate with the two user equipments through a Uu (UTRAN-to-UE) air interface. For example, uplink (uplink, UL) communication and downlink (downlink, DL) communication between a RAN and UE 1 or UE 2 in FIG. 1 are performed, and the two user equipments may communicate with each other through a sidelink (sidelink, SL) carrier. The network device and the user equipments in FIG. 1 are in the network coverage, and may be in a connected state, an idle state, or an inactive state. In the communication scenario without network coverage, the network device and the user equipments do not communicate with each other, and the two user equipments may communicate with each other through an SL carrier. It should be noted that the sidelink SL carrier is usually a carrier on a PC5 interface. The sidelink SL herein is a descriptive limitation on the carrier on the PC5 interface, and is intended to distinguish the carrier on the PC5 interface from a carrier on a Uu interface, but does not constitute any substantive limitation.

By way of example and without limitation, user equipment (for example, the UE 1 and the UE 2 in FIG. 1) in embodiments of this disclosure may be a device having a wireless communication transceiver function or an apparatus or a chip system in a device having a wireless communication transceiver function. A communication apparatus in embodiments of this disclosure supports sidelink communication, and may be deployed on land, including an indoor device, an outdoor device, a roadside device, a handheld device, or a vehicle-mounted device, or may be deployed on a water surface (for example, on a ship), or may be deployed in the air (for example, on a plane, a balloon, or a satellite). A terminal device may be a mobile phone (mobile phone), a tablet computer (pad), a computer having a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), user equipment (user equipment, UE), a vehicle-mounted communication apparatus, a vehicle-mounted communication chip, a roadside unit, a communication apparatus in a roadside unit, or the like.

By way of example and without limitation, a radio access network (radio access network, RAN) device in embodiments of this disclosure may be a device that provides a wireless communication function service for a terminal device, and is usually located on a network side. For example, a specific implementation includes but is not limited to a next generation NodeB (gNodeB, gNB) in a 5th generation (5th generation, 5G) communication system, an evolved NodeB (evolved NodeB, eNB) in an LTE system, a radio network controller (radio network controller, RNC), a NodeB (NodeB, NB), a baseband unit (baseband unit, BBU), a transmission reception point (transmitting and receiving point, TRP), a transmission point (transmitting point, TP), a mobile switching center, an apparatus that provides a wireless communication service for a terminal device in a vehicle to everything (vehicle to everything, V2X) communication (which may also be referred to as internet of vehicles communication) system, a radio controller in a cloud radio access network (cloud radio access network, CRAN) scenario, a relay station, a vehicle-mounted device, a wearable device, a network device in a future evolved network, or the like. In a network structure, a base station may be a RAN device including a central unit (central unit, CU) node, a distributed unit (distributed unit, DU) node, or a CU node and a DU node, or a RAN device including a control plane CU node (CU-CP node), a user plane CU node (CU-UP node), and a DU node.

The following briefly describes Uu air interface communication and SL communication.

Uu Air Interface Communication

A Uu air interface is used for communication between a terminal device and an access network device, and the Uu air interface may also be referred to as Uu for short. In the Uu air interface communication, a channel on which the access network device sends information to the terminal device is referred to as a downlink (downlink, DL) channel, and the downlink channel may include at least one of a physical downlink shared channel (physical downlink shared channel, PDSCH) and a physical downlink control channel (physical downlink control channel, PDCCH). The PDCCH is used to carry downlink control information DCI, and the PDSCH is used to carry downlink data (data). A channel on which the terminal device sends information to the access network device is referred to as an uplink (uplink, UL) channel, and the uplink channel may include at least one of a physical uplink shared channel (physical uplink shared channel, PUSCH) and a physical uplink control channel (physical uplink control channel, PUCCH). The PUSCH is used to carry uplink data. The uplink data may also be referred to as uplink data information. The PUCCH is used to carry uplink control information (uplink control information, UCI) fed back by the terminal device. For example, the UCI may include channel state information (channel state information, CSI), an acknowledgment (acknowledgment, ACK), and/or a negative acknowledgment (negative acknowledgment, NACK) fed back by the terminal device. Transmissions over the Uu air interface may include an uplink transmission and a downlink transmission. The uplink transmission means that the terminal device sends information to the access network device, and the downlink transmission means that the access network device sends information to the terminal device. The information in the uplink transmission may be uplink information or an uplink signal. The uplink information or the uplink signal may include at least one of a PUSCH, a PUCCH, and a sounding reference signal (sounding reference signal, SRS). The information in the downlink transmission may be downlink information or a downlink signal. The downlink information or the downlink signal may include at least one of a PDSCH, a PDCCH, a channel state information reference signal (channel state information reference signal, CSI-RS), and a phase tracking reference signal (phase tracking reference signal, PTRS).

Sidelink (Sidelink, SL) Communication

The SL communication is used for communication between terminals. An SL transmission channel may be carried on an uplink carrier. The uplink carrier may be an uplink carrier on which a network device communicates with a terminal, or may be an independent carrier. It should be understood that a sidelink (sidelink) may also be referred to as a side link, a sideway link, a secondary link, or the like. The sidelink communication may use a physical sidelink shared channel (physical sidelink shared channel, PSSCH) or a physical sidelink control channel (physical sidelink control channel, PSCCH). In other words, an SL resource includes a PSCCH resource and a PSSCH resource. A PSCCH is used to carry first-level sidelink control information (sidelink control information, SCI), a PSSCH is used to carry second-level SCI and data, and information in the SCI may also be referred to as a scheduling assignment (scheduling assignment, SA). The SA includes related information used for data scheduling, for example, information such as PSSCH resource allocation and a modulation and coding scheme. The PSSCH and the PSCCH may be channels sent by a transmit end terminal (for example, a terminal 1) to a receive end terminal (for example, a terminal 2).

A typical application scenario of the Uu air interface communication and the SL communication is the internet of vehicles. In V2X, each vehicle is user equipment, and data may be directly transmitted between two vehicles through an SL, or may be transmitted through a network based on a Uu interface.

With development of wireless communication technologies, people have increasing requirements for a high data rate and user experience, and have increasing requirements for a proximity service for knowing and communicating with people or things around. Therefore, a device-to-device (device-to-device, D2D) technology emerges. Application of the D2D technology can lighten load of a cellular network, reduce battery power consumption of user equipment, improve a data rate, and better meet a requirement for a proximity service. The D2D technology allows a plurality of user equipments (user equipment, UE for short) that support a D2D function to perform direct discovery and direct communication when a network infrastructure exists or no network infrastructure exists. In view of features and advantages of the D2D technology, a D2D technology-based internet-of-vehicles application scenario is proposed. However, considering security, a latency requirement is quite high in this scenario, and cannot be met by using the existing D2D technology.

Therefore, in a network of an LTE technology proposed by the 3rd Generation Partnership Project (the 3rd Generation Partnership Project, 3GPP), an internet of vehicles technology of vehicle-to-everything (vehicle-to-everything, V2X) communication is proposed. The V2X communication refers to communication between a vehicle and any object outside, and includes, for example, vehicle to vehicle (vehicle to vehicle, V2V) communication shown in (a) in FIG. 2, vehicle to pedestrian (vehicle to pedestrian, V2P) communication and vehicle to infrastructure (vehicle to infrastructure, V2I) communication shown in (b) in FIG. 2, and vehicle to network (vehicle to network, V2N) communication shown in (c) in FIG. 2.

The V2X communication is intended for high-speed devices represented by vehicles, and is a basic and key technology to be used in future scenarios that have a quite high communication latency requirement, such as scenarios of intelligent vehicles, autonomous driving, and intelligent transportation systems. LTE V2X communication can support communication scenarios with network coverage and communication scenarios without network coverage, and a resource allocation manner in the LTE V2X communication may be a network access device scheduling mode, for example, an evolved universal terrestrial radio access network NodeB (E-UTRAN NodeB, eNB for short) scheduling mode and a UE autonomous-selection mode. Based on the V2X technology, vehicle user equipment (vehicle UE, V-UE for short) can send some information of the vehicle user equipment to surrounding V-UE, for example, send information such as a location, a speed, and an intention (turning, paralleling, or reversing) periodically, and send information triggered by some aperiodic events. Similarly, the V-UE also receives information from a surrounding user in real time. The 3GPP standards organization officially published the first version the LTE V2X standard, namely, LTE Release (Release) 14 in early 2017.

LTE V2X meets some basic requirements in a V2X scenario. However, existing LTE V2X cannot effectively support an application scenario such as fully intelligent driving or autonomous driving in the future. With development of 5G NR technologies in the 3GPP standards organization, 5G NR V2X further develops. For example, the 5G NR V2X can support a lower transmission latency, a more reliable communication transmission, a higher throughput, and better user experience, to meet wider application scenario requirements.

It can be learned from the foregoing that, in an NR V2X scenario with network coverage, user equipment may send a channel in three different sending modes, and may separately send a single carrier of a Uu air interface to a network device and a single carrier of a sidelink (sidelink, SL) to other user equipment in a plurality of implementations. For example, the single carrier is sent to the network device only through the Uu air interface, or the single carrier is sent to the other user equipment only through the SL carrier, or the single carrier is sent to the network device and another terminal device separately through the Uu air interface and the SL carrier. When the single carrier is sent to the network device and the another terminal device separately through the Uu air interface and the SL carrier, time periods of Uu air interface communication and SL carrier communication may overlap, or time periods of Uu air interface communication and SL carrier communication may not overlap. In the foregoing different implementations, configured maximum output powers (configured maximum output power) suitable for the user equipment are different.

Currently, in a V2X scenario with network coverage, or more specifically, when Uu and an SL work simultaneously, a terminal device first separately determines a configured maximum output power for the terminal device when the terminal device performs a transmission through an SL single carrier and a configured maximum output power for the terminal device when the terminal device performs a transmission through a Uu single carrier, and then determines a configured maximum output power for the terminal device based on the configured maximum output powers for the two transmission manners. It should be understood that a maximum power reduction is needed for determining the configured maximum output power. When the configured maximum output power during the SL single-carrier transmission is determined, only a maximum power reduction during the SL single-carrier transmission is considered. When the configured maximum output power during the Uu single-carrier transmission is determined, only a maximum power reduction during the Uu single-carrier transmission is considered. In this case, if the method is still used when time periods of Uu air interface communication and SL carrier communication overlap, it is likely that a determined configured maximum output power is inappropriate. Consequently, there is a risk that a radio frequency indicator (such as a spurious emission and a spectrum emission mask) cannot be met.

It can be learned that, in the method for determining the configured maximum output power for the terminal device, whether the time periods of the Uu air interface communication and the SL carrier communication overlap is not determined. Therefore, different maximum power reductions cannot be flexibly selected based on whether the time periods of the Uu air interface communication and the SL carrier communication overlap. Consequently, an appropriate configured output power cannot be determined.

Therefore, in the communication scenario with network coverage, or more specifically, when the Uu and the SL work simultaneously, how to flexibly determine an appropriate configured maximum output power is an urgent problem to be resolved.

To better understand the technical solutions in embodiments of this disclosure, the following describes some related concepts.

1. Configured Maximum Output Power (Configured Maximum Output Power)

UE determines the configured maximum output power based on resources configured on a network, such as an RB allocation location, a contiguous RB allocation length, and a modulation scheme. In the following formula, a configured maximum output power for a single carrier during SL transmission in NR V2X is used as an example to describe an existing calculation manner of the configured maximum output power.

The configured maximum output power has an upper and lower bound range.

$$P_{CMAX\_L,f,c} \le P_{CMAX,f,c} \le P_{CMAX\_H,f,c}.$$

Herein, $$P_{CMAX\_L,f,c} = \text{MIN}\{P_{EMAX,c} - \Delta T_{C,c}, P_{PowerClass} - \text{MAX}(\text{MAX}(MPR_c, A\text{-}MPR_c) + \Delta T_{IB,c} + \Delta T_{C,c}, P\text{-}MPR_c), P_{Regulatory,c}\}.$$

$$P_{CMAX\_H,f,c} = \text{MIN}\{P_{EMAX,c}, P_{PowerClass}, P_{Regulatory}\}.$$

An upper bound is determined by a smallest value among a cell-level power $P_{EMAX,c}$ configured on the network, a transmitted power class $P_{PowerClass}$ reported by the UE, and a regulatory restriction $P_{Regulatory}$ in some scenarios. A lower bound is mainly determined by the transmitted power class $P_{PowerClass}$ reported by the UE and maximum power reductions $MPR_c$ and $A\text{-}MPR_c$. Generally, only the maximum power reduction $MPR_c$ may be considered herein.

Similarly, a configured maximum output power for a Uu single carrier may also be defined by using a configured maximum output power similar to that of the SL. Details are not described herein.

2. Maximum Power Reduction (Maximum Power Reduction, MPR)

The maximum power reduction is a maximum power reduction required by a terminal device based on a resource allocation of a physical channel to meet specific radio frequency indicators such as a spurious emission, a spectrum emission mask, an adjacent channel leakage ratio (adjacent channel leakage ratio, ACLR), and an error vector magnitude (error vector magnitude, EVM). The maximum power reduction is related to an allocation location of a resource block (resource block, RB) resource in a carrier, a quantity of RBs, and a modulation scheme for communication, for example, quadrature phase shift keying (quadrature phase shift keying, QPSK) and 16 quadrature amplitude modulation (quadrature amplitude modulation, QAM). On a basis of meeting the maximum power reduction MPR, UE may further need an additional maximum power reduction (additional maximum power reduction), namely, an A-MPR, to meet a spectrum coexistence indicator specified in additional regional regulations.

Figure 3:
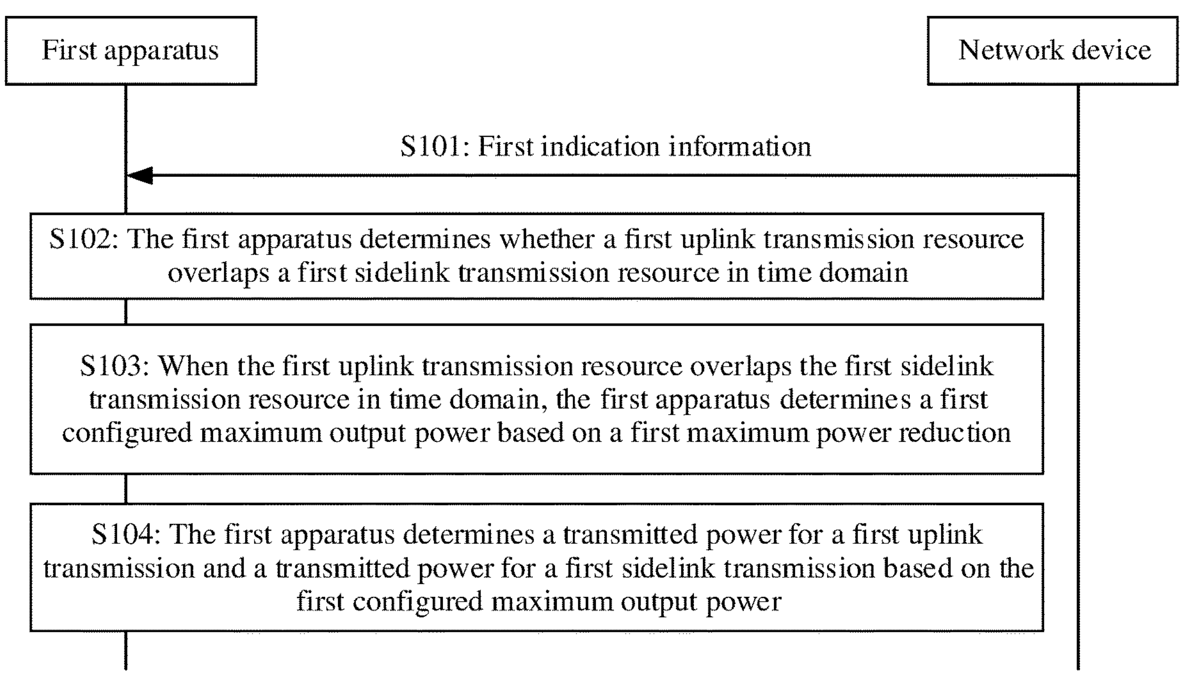
FIG. 3 shows a communication method 100 according to this disclosure.

With reference to FIG. 3, the following describes in detail a communication method 100 in embodiments of this disclosure. FIG. 3 is a schematic flowchart of the method 100 according to this disclosure.

S101: A first apparatus receives first indication information from a network device, and correspondingly, the network device sends the first indication information to the first apparatus, where the first indication information indicates a first uplink transmission resource.

For example, the first indication information herein may be downlink control information or semi-persistent scheduling indication information. For example, the first apparatus may be a terminal device, and the first apparatus receives the first indication information through a Uu air interface. The terminal device is in a radio resource control (radio resource control, RRC) connected state.

S102: The first apparatus determines whether the first uplink transmission resource overlaps a first sidelink transmission resource in time domain.

For example, the first sidelink transmission resource herein may be configured by the network device by using indication information (for example, in a sidelink transmission mode 1), or may be preconfigured (for example, in a sidelink transmission mode 2).

The following is an example for how the first apparatus determines that the first uplink transmission resource overlaps the first sidelink transmission resource in time domain. UE obtains control information of the first sidelink transmission resource before obtaining control information of the first uplink transmission resource. In other words, the UE may determine, based on the control information of the first uplink transmission resource and the control information of the first sidelink transmission resource, that the uplink transmission resource overlaps with multiple sidelink transmission resources in time domain.

For example, the first uplink transmission resource and the first sidelink transmission resource are located in a same frequency band.

For example, the method 100 may be in a scenario in which an uplink transmission (Uu air interface communication) and a sidelink transmission (PC5 interface communication) are simultaneously performed, for example, a concurrent operation scenario.

Then, in a subsequent step, the first apparatus determines a first configured maximum output power based on a determining result (overlapped or not overlapped) in S102.

S103: When the first uplink transmission resource overlaps the first sidelink transmission resource in time domain, the first apparatus determines the first configured maximum output power based on a first maximum power reduction.

It should be understood that the first configured maximum output power herein is a maximum output power for the first apparatus when a related radio frequency indicator is met. In other words, when the first uplink transmission resource overlaps the first sidelink transmission resource in time domain, a sum of configured transmitted powers allocated by the first apparatus to the first uplink transmission resource and the first sidelink transmission resource does not exceed the first configured maximum output power.

It should be further understood that the first maximum power reduction herein is a maximum power reduction corresponding to the con-current mode. For example, the first maximum power reduction is determined based on the first uplink transmission resource and the first sidelink transmission resource.

For example, the first apparatus preconfigures a plurality of first mapping relationships or a plurality of first correspondences. The plurality of mapping relationships or first correspondences may be mapping relationships between the first maximum power reduction and a resource configuration. The resource configuration herein may be, for example, one or more of the following parameters: a resource block (resource block, RB) allocation location, a contiguous RB allocation length, a modulation scheme, and the like. The first apparatus may determine the first maximum power reduction based on the plurality of first mapping relationships or the plurality of first correspondences. For example, the first mapping relationship or the first correspondence herein may be presented in a form of a table, or may be presented in another manner. This is not limited in this application.

The first apparatus may first determine an upper bound and a lower bound of the first configured maximum output power, and then determine the first configured maximum output power based on the upper bound and the lower bound. In an example, the first apparatus determines the lower bound based on the first maximum power reduction. In another example, the first apparatus determines the lower bound based on the first maximum power reduction and a first power class, and the first apparatus determines the lower bound based on the first power class. Alternatively, the first power class herein may be determined based on a transmission resource in which the first uplink transmission resource overlaps the first sidelink transmission resource, or the first power class herein may be determined based on a transmission resource in which the first uplink transmission resource overlaps the first sidelink transmission resource and preconfigured information. For details, refer to descriptions of Example 1 in a possible implementation 1 in the method 300.

S104: The first apparatus determines a transmitted power for a first uplink transmission and a transmitted power for a first sidelink transmission based on the first configured maximum output power.

A sum of the transmitted power for the first uplink transmission and the transmitted power for the first sidelink transmission does not exceed the first configured maximum output power, the first uplink transmission is carried on the first uplink transmission resource, and the first sidelink transmission is carried on the first sidelink transmission resource.

According to the foregoing method, when the first uplink transmission resource overlaps the first sidelink transmission resource in time domain, the first apparatus determines the configured maximum output power by using the maximum power reduction corresponding to the con-current mode. This reduces a problem in the conventional technology that because overlapping is not considered, a radio frequency indicator may not be met because maximum power reductions of different transmission resources are still used to determine a configured maximum output power when the resources overlap.

When the first uplink transmission resource overlaps the first sidelink transmission resource in time domain, the first apparatus determines the configured maximum output power by using the maximum power reduction corresponding to the con-current mode, and determines the transmitted power for the uplink transmission and the transmitted power for the sidelink transmission based on the configured maximum output power in the con-current mode, so that a transmission power in the con-current mode can meet spectrum indicators corresponding to a spurious emission, a spectrum emission mask, and the like, and communication quality and a success rate are improved.

In this embodiment of this disclosure, when the first uplink transmission resource overlaps the first sidelink transmission resource, the first apparatus determines an appropriate configured maximum output power in the con-current mode, so that communication quality can be effectively improved, and a communication success rate can be effectively improved.

Optionally, the method 100 may further include the following steps.

Corresponding to S103, when the first uplink transmission resource does not overlap the first sidelink transmission resource in time domain, the first apparatus may determine the first configured maximum output power in different manners.

It should be understood that, when the first uplink transmission resource does not overlap the first sidelink transmission resource in time domain, there may be a plurality of cases for a corresponding resource sent by the first apparatus. For example, the first apparatus may send only the uplink transmission resource, or the first apparatus may send only the sidelink transmission resource.

Manner 1: The first apparatus determines the first configured maximum output power based on the first maximum power reduction.

It should be understood that the first maximum power reduction herein is described in S103. In addition, how to determine the first configured maximum output power based on the first maximum power reduction may also be described in S103.

Manner 2: The first apparatus determines the first configured maximum output power based on a second maximum power reduction, where the second maximum power reduction is determined based on the first uplink transmission resource; or the first apparatus determines the first configured maximum output power based on a third maximum power reduction, where the third maximum power reduction is determined based on the first sidelink transmission resource.

It should be understood that, that the first uplink transmission resource does not overlap the first sidelink transmission resource in time domain may be understood as that the first apparatus performs only the sidelink transmission or the uplink transmission in a specific time period. In this case, when the configured maximum output power for the first apparatus is determined, a transmitted power corresponding to a currently sent transmission resource is determined. Before the transmitted power corresponding to the currently sent transmission resource is determined, an upper bound and/or a lower bound of the transmitted power need to be first determined.

For example, the following describes a manner of determining the first configured maximum output power by using an example in which the first apparatus performs only the first sidelink transmission. The first apparatus calculates, based on the third maximum power reduction, a lower bound of the transmitted power corresponding to the sidelink transmission resource, that is, uses the lower bound as the lower bound of the configured maximum output power for the first apparatus. Alternatively, the first apparatus calculates, based on the third maximum power reduction and a third power class, a lower bound of the transmitted power corresponding to the sidelink transmission resource, that is, uses the lower bound as the lower bound of the configured maximum output power for the first apparatus. The third power class herein may be determined based on the sidelink transmission resource or determined based on the sidelink transmission resource and the preconfigured information. Alternatively, the third maximum power reduction herein may be the first maximum power reduction. In other words, the first apparatus calculates, based on the first maximum power reduction and a third power class, a lower bound of the transmitted power corresponding to the sidelink transmission resource, that is, uses the lower bound as the lower bound of the configured maximum output power for the first apparatus. For example, a manner of determining the first configured maximum output power by using an example in which the first apparatus performs only the sidelink transmission is similar to the foregoing example. Details are not described herein again.

In this implementation, when the uplink transmission resource does not overlap the sidelink transmission resource, the first apparatus determines the respective configured maximum output powers by using the maximum power reductions corresponding to the respective transmissions, to determine a transmitted power for each transmission. This reduces a problem that communication quality deteriorates and a communication success rate decreases due to an excessively large maximum power reduction in a scenario in which transmission resources do not overlap in time domain.

In the foregoing implementation, when the first uplink transmission resource does not overlap the first sidelink transmission resource, the first apparatus flexibly determines an appropriate configured maximum output power, so that communication quality of the first apparatus can be effectively improved, and a communication success rate can be effectively improved.

Optionally, the method 100 may further include the following steps.

Corresponding to S103, when the first uplink transmission resource does not overlap the first sidelink transmission resource in time domain, the first apparatus may determine the first configured maximum output power in different manners.

Manner 1: The first apparatus determines the first configured maximum output power based on the first maximum power reduction, and the first apparatus determines the transmitted power for the first uplink transmission or the transmitted power for the first sidelink transmission based on the first configured maximum output power, where the transmitted power for the first uplink transmission or the transmitted power for the first sidelink transmission does not exceed the first configured maximum output power.

Manner 2: The first apparatus determines a second configured maximum output power based on a second maximum power reduction, where the second maximum power reduction is a maximum power reduction corresponding to a carrier on which the first uplink transmission resource is located, and the first apparatus determines the transmitted power for the first uplink transmission based on the second configured maximum output power, where the transmitted power for the first uplink transmission does not exceed the second configured maximum output power; or the first apparatus determines a third configured maximum output power based on a third maximum power reduction, where the third maximum power reduction is a maximum power reduction corresponding to a carrier on which the first sidelink transmission resource is located, and the first apparatus determines the transmitted power for the first sidelink transmission based on the third configured maximum output power, where the transmitted power for the first sidelink transmission does not exceed the third configured maximum output power.

In the foregoing solution, the configured maximum output power is not determined by using the maximum power reduction corresponding to the con-current mode in all cases in which time domain resources may overlap, to reduce a problem that communication quality deteriorates and a communication success rate decreases due to an excessively large maximum power reduction in a non-con-current scenario.

When the uplink transmission resource does not overlap the sidelink transmission resource, the first apparatus determines the respective configured maximum output powers by using the maximum power reductions corresponding to the respective transmissions, to determine a transmitted power for each transmission. This reduces a problem that communication quality deteriorates and a communication success rate decreases due to an excessively large maximum power reduction in a scenario in which transmission resources do not overlap in time domain.

In the foregoing implementation, when the first uplink transmission resource does not overlap the first sidelink transmission resource, the first apparatus flexibly determines an appropriate configured maximum output power, so that communication quality of the first apparatus can be effectively improved, and a communication success rate can be effectively improved.

Based on S103, when the first uplink transmission resource overlaps the first sidelink transmission resource in time domain, the configured maximum output power is determined according to the method in S103, and priorities of the sidelink transmission and the uplink transmission may be considered when power allocation is separately performed on the sidelink transmission and the uplink transmission.

Optionally, the method 100 further includes the following steps.

In an example, the first apparatus determines that a priority of the first uplink transmission is higher than a priority of the first sidelink transmission; the first apparatus determines a second configured maximum output power, where the second configured maximum output power is a maximum output power for the first uplink transmission; and the first apparatus determines a third configured maximum output power based on the first configured maximum output power and the second configured maximum output power, where the third configured maximum output power is a maximum output power for the first sidelink transmission.

In this example, because the first uplink transmission has a higher priority, during power allocation, it is preferentially ensured that the first uplink transmission can use the second configured maximum output power determined based on a second maximum power reduction, and then the third configured maximum output power is determined based on a power obtained by subtracting the second configured maximum output power from the first configured maximum output power.

Alternatively, in another example, the first apparatus determines that a priority of the first sidelink transmission is higher than a priority of the first uplink transmission; the first apparatus determines a third configured maximum output power, where the third configured maximum output power is a maximum output power for the first sidelink transmission;

and the first apparatus determines a second configured maximum output power based on the first configured maximum output power and the third configured maximum output power, where the second configured maximum output power is a maximum output power for the first uplink transmission.

In this example, because the first sidelink transmission has a higher priority, during power allocation, it is preferentially ensured that the first sidelink transmission can determine, based on a third maximum power reduction, the third configured maximum output power used by the first sidelink transmission, and then the second configured maximum output power is determined based on a power obtained by subtracting the third configured maximum output power from the first configured maximum output power.

Based on S103, that is, when the first uplink transmission resource overlaps the first sidelink transmission resource in time domain, the first uplink transmission resource may further overlap at least one second sidelink transmission resource other than the first sidelink transmission resource, or the first sidelink transmission resource may further overlap at least one second uplink transmission resource other than the first uplink transmission resource. In this case, the first apparatus may determine the first configured maximum output power based on the first maximum power reduction according to the following method. For example, the at least one second sidelink transmission resource, the at least one second uplink transmission resource, the first uplink transmission resource, and the first sidelink transmission resource are located in a same frequency band.

In this embodiment of this disclosure, after the appropriate configured maximum output power is determined, power allocation is performed on different transmission resources based on priorities of the different transmission resources, so that communication quality can be further improved, and a communication success rate can be ensured.

Based on S103 and S104, when the first uplink transmission resource overlaps the first sidelink transmission resource in time domain, the configured maximum output power is determined according to the method in S103, and priorities of the sidelink transmission and the uplink transmission may be considered when power allocation is separately performed on the sidelink transmission and the uplink transmission.

Optionally, the method 100 further includes the following steps.

In a possible case 1, the first uplink transmission resource overlaps the first sidelink transmission resource in time domain, and a priority of the first uplink transmission is higher than a priority of the first sidelink transmission.

That the first apparatus determines a transmitted power for a first uplink transmission and a transmitted power for a first sidelink transmission based on the first configured maximum output power includes:

- the first apparatus determines the transmitted power for the first uplink transmission, where the transmitted power for the first uplink transmission is a smaller value between the transmitted power for the first uplink transmission and the first configured maximum output power, the transmitted power for the first uplink transmission is determined based on a second maximum power reduction, and the second maximum power reduction is a maximum power reduction corresponding to a carrier on which the first uplink transmission resource is located; and
- the first apparatus determines the transmitted power for the first sidelink transmission based on the first configured maximum output power and the transmitted power for the first uplink transmission.

In a possible case 2, the first uplink transmission resource overlaps the first sidelink transmission resource in time domain, and a priority of the first sidelink transmission is higher than a priority of the first uplink transmission.

That the first apparatus determines a transmitted power for a first uplink transmission and a transmitted power for a first sidelink transmission based on the first configured maximum output power includes:

- the first apparatus determines the transmitted power for the first sidelink transmission, where the transmitted power for the first sidelink transmission is a smaller value between the transmitted power for the first sidelink transmission and the first configured maximum output power, the transmitted power for the first sidelink transmission is determined based on a third maximum power reduction, and the third maximum power reduction is a maximum power reduction corresponding to a carrier on which the first sidelink transmission resource is located; and
- the first apparatus determines the transmitted power for the first uplink transmission based on the first configured maximum output power and the transmitted power for the first sidelink transmission.

In the foregoing implementation, the first apparatus may consider priorities of overlapped transmission resources, and preferentially determine a transmitted power for a transmission with a higher priority, to ensure a success rate of the transmission with a higher priority, to further improve communication quality.

Optionally, the method 100 further includes the following steps.

In an example, the first apparatus receives second indication information from the network device, where the second indication information indicates at least one second uplink transmission resource; and the first apparatus determines that the first sidelink transmission resource overlaps the at least one second uplink transmission resource. It should be understood that, with reference to step S103, it can be learned that the first sidelink transmission resource overlaps the first uplink transmission resource and the at least one second uplink transmission resource, and among the first sidelink transmission resource, the first uplink transmission resource, and the at least one second uplink transmission resource, the first sidelink transmission resource is the longest in time domain. For example, the uplink transmission resource and the sidelink transmission resource of the first apparatus have different subcarrier spacings. Consequently, the uplink transmission resource and the sidelink transmission resource include different slot lengths or different orthogonal frequency division multiplexing (orthogonal frequency division multiplexing, OFDM) symbol lengths in time domain. For example, when a subcarrier spacing is 15 kHz, a length of an OFDM symbol that does not include a CP is 66.67 μs; or when a subcarrier spacing is 60 kHz, a length of an OFDM symbol that does not include a CP is 16.67 μs. Herein, that the first sidelink transmission resource is the longest in time domain may be understood as that the sidelink transmission resource occupies a longest slot or a longest OFDM symbol in time domain.

In the foregoing case, that the first apparatus determines the first configured maximum output power based on a first maximum power reduction may specifically include the following steps.

Step 1: The first apparatus determines at least one fourth configured maximum output power based on at least one fourth maximum power reduction.

The fourth configured maximum output power is a maximum output power for the first sidelink transmission and the second uplink transmission, or the fourth configured maximum output power is a joint maximum output power for the first sidelink transmission and the second uplink transmission. A sum of the transmitted power for the first sidelink transmission and the transmitted power for the second uplink transmission does not exceed the fourth configured maximum output power. The fourth maximum power reduction is determined based on a resource in which the first sidelink transmission resource overlaps the second uplink transmission resource.

For example, the first apparatus may separately determine upper bounds and lower bounds of maximum output powers for the first sidelink transmission and each second uplink transmission. A determined lower bound of each maximum output power is determined based on each fourth maximum power reduction.

Step 2: The first apparatus determines a fifth configured maximum output power based on the first maximum power reduction, where the fifth configured maximum output power is a maximum output power for the first sidelink transmission and the first uplink transmission.

For example, the first maximum power reduction is determined based on the transmission resource in which the first uplink transmission resource overlaps the first sidelink transmission resource. The first apparatus separately determines upper bounds and lower bounds of maximum output powers for the first sidelink transmission and the first uplink transmission. A determined lower bound of each maximum output power is determined based on each first maximum power reduction.

With reference to step 1 and step 2, the first apparatus obtains a transmitted power corresponding to a resource in which the first uplink transmission resource overlaps the first sidelink transmission resource and a transmitted power corresponding to a resource in which the first uplink transmission resource overlaps the at least one second sidelink transmission resource.

Step 3: The first apparatus determines the first configured maximum output power based on the at least one fourth configured maximum output power and the fifth configured maximum output power.

For example, the first apparatus determines an upper bound and a lower bound of the first configured maximum output power based on the at least one fourth configured maximum output power and the fifth configured maximum output power, to determine the first configured maximum output power. For example, the first apparatus may use a largest value in the at least one fourth configured maximum output power and the fifth configured maximum output power as the upper bound of the first configured maximum output power, and use a smallest value in the at least one fourth configured maximum output power and the fifth configured maximum output power as the lower bound of the first configured maximum output power, to determine the first configured maximum output power.

For example, the first apparatus determines the upper bound and the lower bound of the first configured maximum output power based on an upper bound and a lower bound of the at least one fourth configured maximum output power and an upper bound and a lower bound of the fifth configured maximum output power, to determine the first configured maximum output power. For example, the first apparatus may use a largest value in the upper bounds of the at least one fourth configured maximum output power and the fifth configured maximum output power as the upper bound of the first configured maximum output power, and use a smallest value in the lower bounds of the at least one fourth configured maximum output power and the fifth configured maximum output power as the lower bound of the first configured maximum output power, to determine the first configured maximum output power. For details, refer to descriptions in S401*b* to S403*b* in a method 400.

In another example, the first apparatus receives second indication information from the network device, where the second indication information indicates at least one second sidelink transmission resource; and the first apparatus determines that the first uplink transmission resource overlaps the at least one second sidelink transmission resource. It should be understood that, with reference to step S103, it can be learned that the first uplink transmission resource overlaps the first sidelink transmission resource and the at least one second sidelink transmission resource, and among the first uplink transmission resource, the first sidelink transmission resource, and the at least one second sidelink transmission resource, the first uplink transmission resource is the longest in time domain. For example, the sidelink transmission resource and the uplink transmission resource of the first apparatus have different subcarrier spacings. Consequently, the sidelink transmission resource and the uplink transmission resource include different slot lengths or different orthogonal frequency division multiplexing (orthogonal frequency division multiplexing, OFDM) symbol lengths in time domain. For example, when a subcarrier spacing is 15 kHz, a length of an OFDM symbol that does not include a CP is 66.67 μs; or when a subcarrier spacing is 60 kHz, a length of an OFDM symbol that does not include a CP is 16.67 μs. Herein, that the first uplink transmission resource is the longest in time domain may be understood as that the uplink transmission resource occupies a longest slot or a longest OFDM symbol in time domain.

In the foregoing case, that the first apparatus determines the first configured maximum output power based on a first maximum power reduction may specifically include the following steps.

Step 1: The first apparatus determines at least one fourth configured maximum output power based on at least one fourth maximum power reduction.

The fourth configured maximum output power is a maximum output power corresponding to the first uplink transmission and the second sidelink transmission, and the fourth maximum power reduction is determined based on a resource in which the first uplink transmission resource overlaps the second sidelink transmission resource.

It should be understood that the first apparatus separately determines upper bounds and lower bounds of maximum output powers corresponding to the first uplink transmission resource and each second sidelink transmission resource. A determined lower bound of each maximum output power is determined based on each fourth maximum power reduction.

Step 2: The first apparatus determines a fifth configured maximum output power based on the first maximum power reduction, where the fifth configured maximum output power is a maximum output power corresponding to the first uplink transmission resource and the first sidelink transmission resource.

It should be understood that, the first maximum power reduction is determined based on a transmission resource in which the first sidelink transmission resource overlaps the first uplink transmission resource. The first apparatus separately determines upper bounds and lower bounds of maximum output powers corresponding to the first uplink transmission resource and the first sidelink transmission resource. A determined lower bound of each maximum output power is determined based on each first maximum power reduction.

With reference to step 1 and step 2, the first apparatus obtains a transmitted power corresponding to a resource that is in the first sidelink transmission resource and the at least one second sidelink transmission resource and that overlaps the first uplink transmission resource.

Step 3: The first apparatus determines the first configured maximum output power based on the at least one fourth configured maximum output power and the fifth configured maximum output power.

For example, the first apparatus determines an upper bound and a lower bound of the first configured maximum output power based on the at least one fourth configured maximum output power and the fifth configured maximum output power, to determine the first configured maximum output power. For example, the first apparatus may use a largest value in the at least one fourth configured maximum output power and the fifth configured maximum output power as the upper bound of the first configured maximum output power, and use a smallest value in the at least one fourth configured maximum output power and the fifth configured maximum output power as the lower bound of the first configured maximum output power, to determine the first configured maximum output power.

For example, the first apparatus determines the upper bound and the lower bound of the first configured maximum output power based on an upper bound and a lower bound of the at least one fourth configured maximum output power and an upper bound and a lower bound of the fifth configured maximum output power, to determine the first configured maximum output power. For example, the first apparatus may use a largest value in the upper bounds of the at least one fourth configured maximum output power and the fifth configured maximum output power as the upper bound of the first configured maximum output power, and use a smallest value in the lower bounds of the at least one fourth configured maximum output power and the fifth configured maximum output power as the lower bound of the first configured maximum output power, to determine the first configured maximum output power.

For details, refer to descriptions in S401*a* to S403*a* in the method 400.

In this embodiment of this disclosure, when one uplink transmission resource overlaps a plurality of sidelink transmission resources, or when one sidelink transmission resource overlaps a plurality of uplink transmission resources, a configured maximum output power is separately determined based on two resources that overlap each other, to determine a range of the configured maximum output power for the first apparatus, so as to determine the configured maximum output power for the first apparatus. This further extends an application range of the power increasing method in this disclosure, so that a manner of determining the configured maximum output power is more flexible, communication quality is further improved, and the communication success rate is further improved.

In another example, the first apparatus receives second indication information from the network device, where the second indication information indicates a second uplink transmission resource; when the second uplink transmission resource overlaps the first sidelink transmission resource in time domain, the first apparatus determines a fourth configured maximum output power based on a fourth maximum power reduction, where the fourth maximum power reduction is a maximum power reduction corresponding to the con-current mode, and the fourth maximum power reduction is determined based on the second uplink transmission resource and the first sidelink transmission resource; and when the fourth configured maximum output power is greater than the first configured maximum output power, the first apparatus determines a transmitted power for a second uplink transmission based on the first configured maximum output power, where a sum of the transmitted power for the second uplink transmission and the transmitted power for the first sidelink transmission does not exceed the first configured maximum output power, and the second uplink transmission is carried on the second uplink transmission resource.

It should be understood that, when one sidelink transmission resource overlaps a plurality of uplink transmission resources, a plurality of configured maximum output powers are determined based on a maximum power reduction that is determined based on the sidelink transmission resource and each uplink transmission resource, and a minimum value in the plurality of configured maximum output powers is determined as the configured maximum output power for the first apparatus.

In the foregoing implementation, when one sidelink transmission resource overlaps a plurality of uplink transmission resources, in a plurality of time domain resources in which the sidelink transmission resource overlaps the plurality of uplink transmission resources, it can be ensured that a spectrum indicator of a spurious emission meets a requirement, and communication quality can be further improved.

In another example, the first apparatus determines at least one second sidelink transmission resource; when the second sidelink transmission resource overlaps the first uplink transmission resource in time domain, the first apparatus determines a fifth configured maximum output power based on a fifth maximum power reduction, where the fifth maximum power reduction is a maximum power reduction corresponding to the con-current mode, and the fifth maximum power reduction is determined based on the second sidelink transmission resource and the first uplink transmission resource; and when the fifth configured maximum output power is greater than the first configured maximum output power, the first apparatus determines a transmitted power for a second sidelink transmission based on the first configured maximum output power, where a sum of the transmitted power for the second sidelink transmission and the transmitted power for the first uplink transmission does not exceed the first configured maximum output power, and the second sidelink transmission is carried on the second sidelink transmission resource.

It should be understood that, when one uplink transmission resource overlaps a plurality of sidelink transmission resources, a plurality of configured maximum output powers are determined based on a maximum power reduction that is determined based on the uplink transmission resource and each sidelink transmission resource, and a minimum value in the plurality of configured maximum output powers is determined as the configured maximum output power for the first apparatus.

In the foregoing implementation, when one uplink transmission resource overlaps a plurality of sidelink transmission resources, in a plurality of time domain resources in which the uplink transmission resource overlaps the plurality of sidelink transmission resources, it can be ensured that a spectrum indicator of a spurious emission meets a requirement, and communication quality can be further improved.

Figure 4:
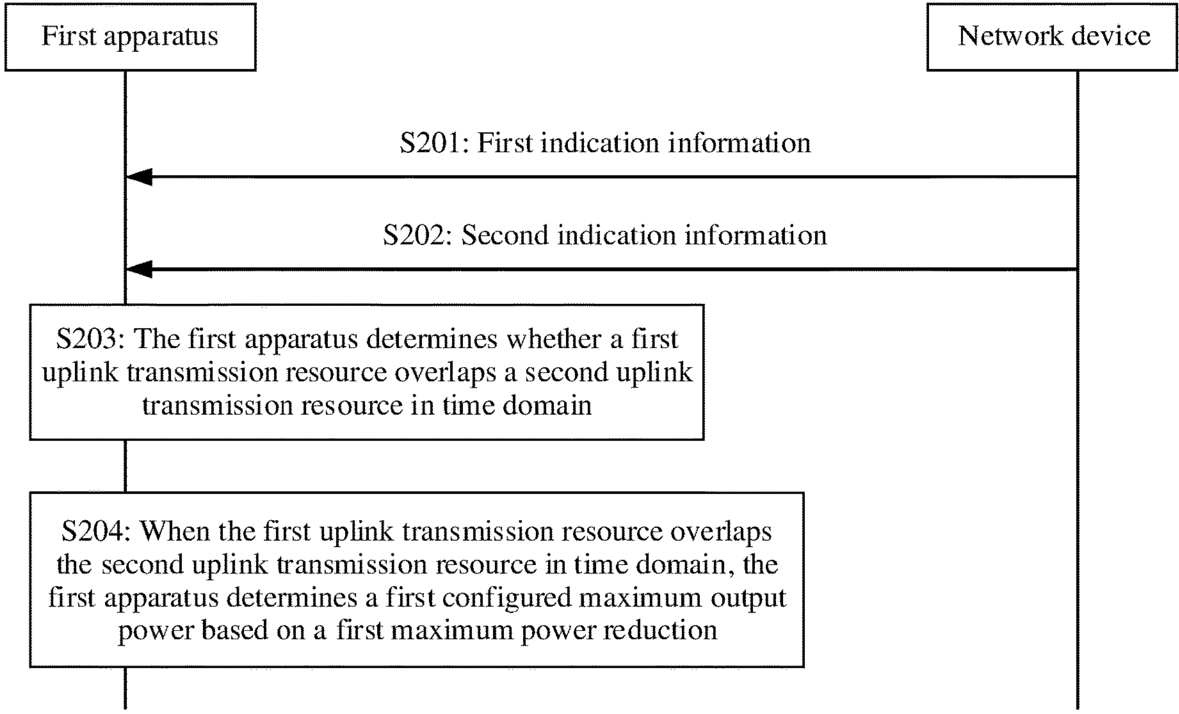
FIG. 4 shows a communication method 200 according to this disclosure.

The following describes a communication method 200 provided in this disclosure with reference to FIG. 4.

S201: A first apparatus receives first indication information from a network device, and correspondingly, the network device sends the first indication information to the first apparatus, where the first indication information indicates a first uplink transmission resource.

For example, the first indication information herein may be downlink control information or semi-persistent scheduling indication information. For example, the first apparatus may be a terminal device, and the first apparatus receives the first indication information through a Uu air interface. The terminal device is in a radio resource control (radio resource control, RRC) connected state.

S202: The first apparatus receives second indication information from the network device, and correspondingly, the network device sends the second indication information to the first apparatus, where the second indication information indicates a second uplink transmission resource.

S203: The first apparatus determines whether the first uplink transmission resource overlaps the second uplink transmission resource in time domain.

S204: When the first uplink transmission resource overlaps the second uplink transmission resource in time domain, the first apparatus determines the first configured maximum output power based on a first maximum power reduction.

It should be understood that the first configured maximum output power herein is a maximum output power used by the first apparatus to perform the first uplink transmission and the second uplink transmission. In other words, when the first uplink transmission resource overlaps the second uplink transmission resource in time domain, a sum of configured transmitted powers allocated by the terminal device to the first uplink transmission resource and the second uplink transmission resource is the first configured maximum output power.

It should be further understood that the first maximum power reduction herein is a maximum power reduction corresponding to a con-current mode. For example, the first apparatus preconfigures a plurality of first mapping relationships or a plurality of first correspondences. The plurality of mapping relationships or first correspondences may be mapping relationships between the first maximum power reduction and a resource configuration of the foregoing overlapped transmission resources. The resource configuration herein may be, for example, one or more of the following parameters: a resource block (resource block, RB) allocation location, a contiguous RB allocation length, a modulation scheme, and the like. The first apparatus may determine the first maximum power reduction based on the plurality of first mapping relationships or the plurality of first correspondences.

When the first apparatus determines the first configured maximum output power based on the first maximum power reduction, the first apparatus first determines an upper bound and a lower bound of the first configured maximum output power, and then determines the first configured maximum output power based on the upper bound and the lower bound. In an example, the first apparatus determines the lower bound based on the first maximum power reduction. In another example, the first apparatus determines the lower bound based on the first maximum power reduction and a first power class, and the first apparatus determines the lower bound based on the first power class. Alternatively, the first power class herein may be determined based on a transmission resource in which the first uplink transmission resource overlaps the second uplink transmission resource, or the first power class herein may be determined based on a transmission resource in which the first uplink transmission resource overlaps the second uplink transmission resource and preconfigured information.

In the foregoing method, the first apparatus determines whether the first uplink transmission resource overlaps the second uplink transmission resource in time domain, and further determines an appropriate configured maximum output power based on overlapping between the first uplink transmission resource and the second uplink transmission resource in time domain. When the resources overlap in time domain, the configured maximum output power is determined by using the maximum power reduction corresponding to the con-current mode. This reduces a problem in the conventional technology that because overlapping is not considered, a radio frequency indicator may not be met because maximum power reductions of different transmission resources are still used to determine a configured maximum output power when the resources overlap.

In the foregoing solution, the appropriate configured maximum output power is flexibly determined based on resource overlapping, so that communication quality of the first apparatus can be effectively improved, and a communication success rate can be effectively improved.

Optionally, the method 200 may further include the following steps.

Corresponding to S203, when the first uplink transmission resource does not overlap the second uplink transmission resource in time domain, the first apparatus may determine the first configured maximum output power in different manners.

It should be understood that when the first uplink transmission resource does not overlap the second uplink transmission resource in time domain, the first apparatus may perform only the first uplink transmission, or the first apparatus may perform only the second uplink transmission, or the first apparatus may perform the second uplink transmission and the second uplink transmission.

Manner 1: The first apparatus determines the first configured maximum output power based on the first maximum power reduction.

It should be understood that the first maximum power reduction herein is described in S203. In addition, how to determine the first configured maximum output power based on the first maximum power reduction may also be described in S203.

Manner 2: The first apparatus determines the first configured maximum output power based on a second maximum power reduction, where the second maximum power reduction is determined based on the first uplink transmission resource; or the first apparatus determines the first configured maximum output power based on a third maximum power reduction, where the third maximum power reduction is determined based on the second uplink transmission resource.

It should be understood that, that the first uplink transmission resource does not overlap the second uplink transmission resource in time domain may be understood as that the first apparatus performs only the second uplink transmission or the uplink transmission in a specific time period. In this case, when the configured maximum output power for the first apparatus is determined, a transmitted power corresponding to a currently sent transmission is determined. Before the transmitted power corresponding to the currently sent transmission resource is determined, an upper bound and/or a lower bound of the transmitted power need to be first determined. For example, the following describes a manner of determining the first configured maximum output power by using an example in which the first apparatus performs only the first uplink transmission. The first apparatus calculates, based on the second maximum power reduction, a lower bound of the transmitted power corresponding to the second uplink transmission resource, that is, uses the lower bound as the lower bound of the configured maximum output power for the first apparatus. Alternatively, the first apparatus calculates, based on the second maximum power reduction and a second power class, a lower bound of the transmitted power corresponding to the second uplink transmission resource, that is, uses the lower bound as the lower bound of the configured maximum output power for the first apparatus. The second power class herein may be determined based on the second uplink transmission resource or determined based on the second uplink transmission resource and the preconfigured information. Alternatively, the second maximum power reduction herein may be the first maximum power reduction. In other words, the first apparatus calculates, based on the first maximum power reduction and a second power class, a lower bound of the transmitted power corresponding to the second uplink transmission resource, that is, uses the lower bound as the lower bound of the configured maximum output power for the first apparatus. For example, a manner of determining the first configured maximum output power by using an example in which the first apparatus performs only the second uplink transmission is similar to the foregoing example. Details are not described herein again.

In this embodiment of this disclosure, the configured maximum output power is not determined by using the maximum power reduction corresponding to the con-current mode in all cases in which time domain resources may overlap, to reduce a problem that communication quality deteriorates and a communication success rate decreases due to an excessively large maximum power reduction in a scenario in which time domain resources do not overlap. Therefore, in this embodiment of this disclosure, the appropriate configured maximum output power is flexibly determined based on resource overlapping, so that communication quality of the first apparatus can be effectively improved, and a communication success rate can be effectively improved.

It should be noted that the foregoing manner in which the first apparatus determines the configured maximum output power based on overlapping or non-overlapping of the first uplink transmission resource and the second uplink transmission resource may be further used in a carrier aggregation scenario. In other words, both the first uplink transmission resource and the second uplink transmission resource are determined by indication information of the network device.

Figures 5, 6:
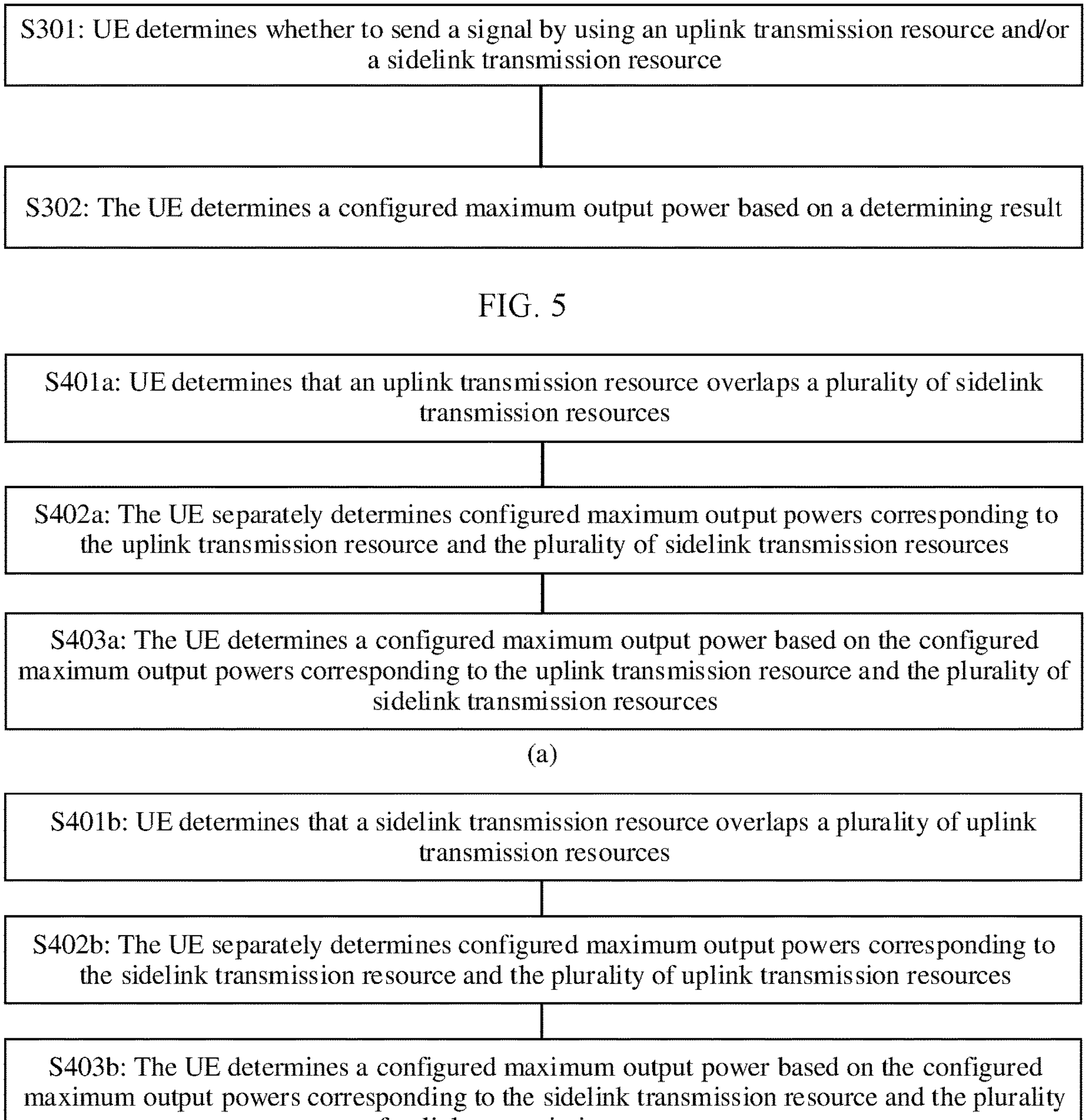
FIG. 5 shows a communication method 300 according to an embodiment of this disclosure.
FIG. 6 shows a power determining method 400 according to this disclosure.

With reference to FIG. 5, the following describes in detail a communication method 300 in embodiments of this disclosure. FIG. 5 is a schematic flowchart of the method 300 according to this disclosure.

It should be understood that, when UE performs communication through a sidelink, a half-duplex problem exists. To be specific, the UE cannot simultaneously perform receiving and sending data on the sidelink. NR V2X has two working manners on the sidelink: a mode 1 (mode 1) and a mode 2 (mode 2). The mode 1 is a base station scheduling manner. The mode 2 is selecting a resource by the UE based on a channel monitoring result. In other words, an SL resource is preconfigured. In addition, Uu air interface communication between the UE and a network device may be in a radio resource control (radio resource control, RRC) idle (idle) state, inactive (inactive) state, and connected (connected) state.

For different cases in which the UE performs an uplink transmission and a sidelink transmission, several specific implementations of the method 300 are separately described.

In a sidelink transmission resource configuration case 1, the UE uses the mode 2 on the sidelink. In other words, the SL resource is preconfigured.

In a possible implementation 1, the UE determines that Uu air interface communication is in the connected state, and the UE performs an SL transmission in an SL preconfigured resource pool.

The possible implementation 1 is specifically implemented by using the following several possible cases.

In a possible case 1, there may be different specific implementations based on whether an uplink transmission resource overlaps the sidelink transmission resource in time domain.

Example 1: The UE determines that the uplink transmission resource overlaps the sidelink transmission resource in time domain.

S301: The UE determines whether to perform an uplink transmission and/or a sidelink transmission.

The UE determines to perform the sidelink transmission and the uplink transmission.

Further, the UE determines that the uplink transmission resource overlaps the sidelink transmission resource in time domain.

The following is an example for how the UE determines that the uplink transmission resource overlaps the sidelink transmission resource in time domain. UE obtains control information of the sidelink transmission resource before obtaining control information of the uplink transmission resource. In other words, the UE may determine, based on the control information of the uplink transmission resource and the control information of the sidelink transmission resource, that the uplink transmission resource overlaps the sidelink transmission resource in time domain.

S302: The UE determines a configured maximum output power based on a determining result.

Because the uplink transmission resource overlaps the sidelink transmission resource in time domain, in this embodiment of this disclosure, it may be considered that the configured maximum output power is calculated by using a joint maximum power reduction of the uplink transmission resource and the sidelink transmission resource when a lower limit of the configured maximum output power is calculated.

Specifically, when calculating the configured maximum output power, the UE first calculates an upper bound and a lower bound of the configured maximum output power. The UE calculates the lower bound based on a maximum power reduction. The maximum power reduction herein may be $MAX(MPR_{con\text{-}current}, A\text{-}MPR_{con\text{-}current})$ or $MPR_{con\text{-}current}$. The $MPR_{con\text{-}current}$ and the $A\text{-}MPR_{con\text{-}current}$ may be determined by the UE based on a resource configuration on a network. The maximum power reduction is determined in a different manner from a maximum power reduction used when the UE performs a transmission through an SL single carrier and a maximum power reduction used when the UE performs a transmission through a Uu single carrier.

The following separately describes specific implementations of determining the configured maximum output power based on a case in which subcarrier spacings of the uplink transmission resource and the sidelink transmission resource are the same and a case in which subcarrier spacings of the uplink transmission resource and the sidelink transmission resource are different.

When the subcarrier spacings are the same:

$$P_{CMAX\_L} \le P_{CMAX} \le P_{CMAX\_H};$$

$$P_{CMAX\_L} = \text{MIN}\{10\log_{10}\sum p_{EMAX,c} - \Delta T_C, P_{PowerClass,con-current} - \text{MAX}(\text{MAX}(MPR_{con-current}, A\text{-}MPR_{con-current}) + \Delta T_{IB,c} + \Delta T_C, P\text{-}MPR)\};$$

and $$P_{CMAX\_H} = \text{MIN}\{10\log_{10}\sum p_{EMAX,c}, P_{PowerClass,con-current}\}.$$

Herein, $p_{EMAX,c}$ is a linear value of $P_{EMAX,c}$, and is given by IE P-Max of a Uu serving cell c or IE slmaxTxPower of the SL. $P_{PowerClass}$, con-current is a maximum UE power corresponding to a power class when the Uu and the SL work simultaneously, and may be predefined. $\Delta T_{IB,c}$ is an allowed maximum configured output power relaxation. For details, refer to regulations in section 6.2.4 in 3GPP TS 38.101-1. P-MPR is a maximum reduction used by the UE for power management. $\Delta T_{C,c}$ is an allowed operating band edge transmission power relaxation of the serving cell c. $AT_C$ is a largest value in $\Delta T_{C,c}$ of all serving cells c.

When the subcarrier spacings are different:

$P_{CMAX,c(i),i}(p)$ is a configured maximum output power corresponding to a slot p of a serving cell c(i) that uses a subcarrier spacing type i, where the subcarrier spacing type i may be 15 kHz, 30 kHz, or 60 kHz.

$P_{CMAX,c(i),i}(p)$ meets the following constraint:

$$P_{CMAX\_L,f,c(i),i}(p) \le P_{CMAX,f,c(i),i}(p) \le P_{CMAX\_H,f,c(i),i}(p).$$

For details about $P_{CMAX\_L,f,c(i),i}(p)$ and $P_{CMAX\_H,f,c(i),i}(p)$, refer to section 6.2E or section 6.2.4 in GPP TS 38.101-1.

A total available configured maximum power $P_{CMAX}(p,q)$ corresponding to a slot p and a slot q that overlap in time meets the following constraint:

$$P_{CMAX\_L}(p, q) \le P_{CMAX}(p, q) \le P_{CMAX\_H}(p, q).$$

When the slots p and q have different transmission lengths and belong to different cells on a same frequency band:

$$P_{CMAX\_L}(p, q) = \text{MIN}\{10\log_{10}[p_{CMAX\_L,f,c(i),Uu,i}(p) + p_{CMAX\_L,f,c(i),V2X,j}(q)], P_{PowerClass,con-current}\};$$

and $$P_{CMAX\_H}(p, q) = \text{MIN}\{10\log_{10}[p_{CMAX\_H,f,c(i),Uu,i}(p) + p_{CMAX\_H,f,c(i),V2X,j}(q)], P_{PowerClass,con-current}\}.$$

Herein, $p_{CMAX\_L,f,c(i),i}$ and $p_{CMAX\_H,f,c(i),i}$ are respective linear values corresponding to $P_{CMAX\_L,f,c(i),i}$ and $P_{CMAX\_H,f,c(i),i}$. $P_{PowerClass,con-current}$ is the maximum UE power corresponding to the power class when the Uu and the SL work simultaneously, and may be predefined.

Example 2: The UE determines that the uplink transmission resource does not overlap the sidelink transmission resource in time domain.

S301: The UE determines whether to perform an uplink transmission and/or a sidelink transmission.

The UE determines to perform the sidelink transmission and the uplink transmission.

Further, the UE determines that the uplink transmission resource does not overlap the sidelink transmission resource in time domain.

S302: The UE determines a configured maximum output power based on a determining result.

Specifically, based on a transmission sent by the UE in each segment of time domain, the UE determines a corresponding transmitted power as the configured maximum output power for the UE based on a corresponding transmission resource. For example, if the UE performs only an uplink transmission in a specific time period or a specific time domain resource, the UE determines, based on a second maximum power reduction corresponding to the uplink transmission resource, a lower bound of a transmitted power corresponding to the uplink transmission resource, and then determines the upper bound of the transmitted power corresponding to the uplink transmission resource, to determine the transmitted power corresponding to the uplink transmission resource as the configured maximum output power for the UE. Similarly, if the UE performs only a sidelink transmission, the UE determines, based on a second maximum power reduction corresponding to the sidelink transmission resource, a lower bound of a transmitted power corresponding to the sidelink transmission resource, and then determines the lower bound of the transmitted power corresponding to the sidelink transmission resource, to determine the transmitted power corresponding to the sidelink transmission resource as the configured maximum output power for the UE.

For example, when the UE performs only the sidelink transmission, the configured maximum output power for the UE is the transmitted power corresponding to the sidelink transmission resource.

$$P_{CMAX\_L,c,SL} \le P_{CMAX,c,SL} \le P_{CMAX\_H,c,SL}.$$

Herein, $$P_{CMAX\_L,c,SL} = \text{MIN}\{P_{EMAX,c} - \Delta T_{C,c}, P_{PowerClass} - \text{MAX}(\text{MAX}(MPR_c, A\text{-}MPR_c) + \Delta T_{IB,c} + \Delta T_{C,c}, P\text{-}MPR_c), P_{Regulatory,c}\}.$$

$$P_{CMAX\_H,c,SL} = \text{MIN}\{P_{EMAX,c}, P_{PowerClass}, P_{Regulatory}\}.$$

An upper bound $P_{CMAX\_H,c,SL}$ is determined by a smallest value in a cell-level power $P_{EMAX,c}$ configured on the network, a transmitted power class $P_{PowerClass}$ reported by the UE, and a regulatory restriction $P_{Regulatory}$ in some scenarios. A lower bound $P_{CMAX\_L,c,SL}$ is mainly determined by the transmitted power class $P_{PowerClass}$ reported by the UE and maximum power reductions $MPR_c$ and A-$MPR_c$. Generally, only the maximum power reduction $MPR_c$ may be considered herein. In other words, the UE determines the lower bound based on MAX($MPR_c$, A-$MPR_c$) corresponding to the sidelink transmission. The MAX($MPR_c$, A-$MPR_c$) herein may alternatively be replaced with the $MPR_c$.

For example, for a value of the $MPR_c$, refer to Table 1. Table 1 shows the MPR when the power class is 3. QAM is quadrature amplitude modulation, and QPSK is quadrature phase shift keying. CP-OFDM is cyclic prefix orthogonal frequency division multiplexing.

TABLE 1

| | | Channel bandwidth/MPR (dB) | |
|---|---|---|---|
| Modulation | | External RB allocation | Internal RB allocation |
| CP-OFDM | QPSK | ≤4.5 | ≤2.5 |
| | 16 QAM | ≤4.5 | ≤2.5 |
| | 64 QAM | ≤4.5 | |
| | 256 QAM | ≤7.0 | |

For example, when the UE performs only the uplink transmission, the configured maximum output power for the UE is the transmitted power corresponding to the uplink transmission resource.

$$P_{CMAX\_L,c,Uu} \leq P_{CMAX,c,Uu} \leq P_{CMAX\_H,c,Uu}.$$

Herein, $$P_{CMAX\_L,c,Uu} = \mathrm{MIN}\{P_{EMAX,c} - \Delta T_{C,c}, (P_{PowerClass} - \Delta P_{PowerClass}) - \mathrm{MAX}(\mathrm{MAX}(MPR_c + \Delta MPR_c, A\text{-}MPR_c) + \Delta T_{IB,c} + \Delta T_{C,c} + \Delta T_{RxSRS}, P\text{-}MPR_c)\}.$$

$$P_{CMAX\_H,c,Uu} = \mathrm{MIN}\{P_{EMAX,c}, P_{PowerClass} - \Delta P_{PowerClass}\}.$$

An upper bound $P_{CMAX\_H,c,Uu}$ is determined by a smaller value in a cell-level power $P_{EMAX,c}$ configured on the network and a transmitted power class $P_{PowerClass}$ reported by the UE. A lower bound $P_{CMAX\_H,c,Uu}$ is mainly determined by the transmitted power class $P_{PowerClass}$ reported by the UE and maximum power reductions $MPR_c$ and A-$MPR_c$. Generally, only the maximum power reduction $MPR_c$ may be considered herein. In other words, the UE determines the lower bound based on MAX($MPR_c$+$\Delta MPR_c$, A-$MPR_c$) corresponding to the uplink transmission. The MAX($MPR_c$+$\Delta MPR_c$, A-$MPR_c$) herein may alternatively be replaced with the $MPR_c$.

For example, for a value of the $MPR_c$, refer to Table 2. Table 2 shows the MPR when the power class is 2. QAM is quadrature amplitude modulation, and QPSK is quadrature phase shift keying. CP-OFDM is cyclic prefix orthogonal frequency division multiplexing.

TABLE 2

| | | MPR (dB) | | |
|---|---|---|---|---|
| Modulation | | Edge RB allocation | External RB allocation | Internal RB allocation |
| DFT-s-OFDM | Pi/2 BPSK | ≤3.5 | ≤0.5 | 0 |
| | QPSK | ≤3.5 | ≤1 | 0 |
| | 16 QAM | ≤3.5 | ≤2 | ≤1 |
| | 64 QAM | ≤3.5 | ≤2.5 | |
| | 256 QAM | | ≤4.5 | |
| CP-OFDM | QPSK | ≤3.5 | ≤3 | ≤1.5 |
| | 16 QAM | ≤3.5 | ≤3 | ≤2 |
| | 64 QAM | | ≤3.5 | |
| | 256 QAM | | ≤6.5 | |

In this embodiment of this disclosure, when the UE performs the uplink transmission and the sidelink transmission, it is determined whether the uplink transmission resource overlaps the sidelink transmission resource in time domain, and an appropriate configured maximum output power is further determined based on overlapping between the uplink transmission resource and the sidelink transmission resource in time domain. When the resources overlap in time domain, the configured maximum output power is determined by using the maximum power reduction corresponding to the con-current mode. This reduces a problem in the conventional technology that because overlapping is not considered, a radio frequency indicator may not be met because maximum power reductions of different transmission resources are still used to calculate a configured maximum output power when the resources overlap. In addition, the configured maximum output power is not determined by using a maximum power reduction corresponding to a con-current mode in all cases in which concurrency is possible, to reduce a problem that communication quality deteriorates and a communication success rate decreases due to an excessively large maximum power reduction in a non-con-current scenario. Therefore, in this embodiment of this disclosure, the appropriate configured maximum output power is flexibly determined based on resource overlapping, so that communication quality of the terminal device can be effectively improved, and a communication success rate can be effectively improved.

Example 3: Based on Example 1, the UE further determines, based on priorities of the sidelink transmission and the uplink transmission, allocation of the configured maximum output power on the sidelink transmission resource and the uplink transmission resource.

Specifically, the UE determines the configured maximum output power according to the implementation of Example 1. For example, a priority of the sidelink transmission is higher than a priority of the uplink transmission. The UE may first calculate the transmitted power for the sidelink transmission based on a maximum power reduction corresponding to the sidelink transmission, and use, for the uplink transmission, a power other than the transmitted power for the sidelink transmission in the configured maximum output power. The lower bound of the transmitted power allocated by the UE to the sidelink transmission may be calculated based on the maximum power reduction corresponding to the sidelink transmission. For calculation of the transmitted power for the sidelink transmission, refer to the calculation manner in Example 2.

Alternatively, specifically, the UE determines the configured maximum output power according to the implementation of Example 1. For example, a priority of the uplink transmission is higher than a priority of the sidelink transmission. The UE may first calculate the transmitted power for the uplink transmission based on a maximum power reduction corresponding to the uplink transmission, and use, for the sidelink transmission, a power other than the transmitted power for the uplink transmission in the configured maximum output power. The lower bound of the transmitted power allocated by the UE to the uplink transmission may be calculated based on the maximum power reduction corresponding to the uplink transmission. For calculation of the transmitted power for the uplink transmission, refer to the calculation manner in Example 2.

In this embodiment of this disclosure, after the appropriate configured maximum output power is determined, power allocation is performed on different transmission resources based on priorities of the different transmission resources, so that communication quality can be further improved, and a communication success rate can be ensured.

In a possible case 2, the UE does not determine or cannot determine whether the uplink transmission resource overlaps the sidelink transmission resource in time domain.

Example 4: S301: The UE Determines Whether to Perform an Uplink Transmission And/or a Sidelink Transmission The UE determines to perform the sidelink transmission and the uplink transmission.

S302: The UE determines a configured maximum output power based on a determining result.

In S301, the UE performs the sidelink transmission and the uplink transmission. In other words, there is a possibility that the uplink transmission resource overlaps the sidelink transmission resource in time domain. Therefore, in this embodiment of this disclosure, the maximum power reduction used to calculate the lower bound of the configured maximum output power may be MAX($MPR_{con\text{-}current}$, A-$MPR_{con\text{-}current}$) or $MPR_{con\text{-}current}$. For a specific determining process, refer to S302 in Example 1 of the possible case 1.

For example, for the UE that performs the sidelink transmission and the uplink transmission in this disclosure, the sidelink transmission resource, the uplink transmission resource, and an overlapped resource in the transmission resources respectively correspond to three different tables. The table may indicate a mapping relationship between a maximum power reduction and a resource configuration on a network.

It should be understood that, when the sidelink transmission and the uplink transmission are sent, there is a possibility that the sidelink transmission resource overlaps the uplink transmission resource. Therefore, the configured maximum output power is determined by using the maximum power reduction corresponding to the con-current mode. This reduces a problem in the conventional technology that because overlapping is not considered, a radio frequency indicator may not be met because maximum power reductions of different transmission resources are still used to calculate a configured maximum output power when the resources overlap.

In this embodiment of this disclosure, an appropriate configured maximum output power can be flexibly determined, communication quality of the terminal device can be effectively improved, and a communication success rate can be effectively improved.

In a possible implementation 2, the UE determines that Uu air interface communication is in the idle state, and the UE performs an SL transmission in an SL preconfigured resource pool.

S301: The UE determines whether to perform an uplink transmission and/or a sidelink transmission.

The UE determines that only the sidelink transmission is sent.

S302: The UE determines a configured maximum output power based on a determining result.

The UE first determines an upper bound and a lower bound of the configured maximum output power, where the lower bound is determined based on MAX($MPR_c$, A-$MPR_c$) corresponding to the sidelink transmission. The MAX($MPR_c$, A-$MPR_c$) herein may alternatively be replaced with the $MPR_c$.

$$P_{CMAX\_L,c,SL} \leq P_{CMAX,c,SL} \leq P_{CMAX\_H,c,SL}.$$

Herein, $$P_{CMAX\_L,c,SL} = \text{MIN}\{P_{EMAX,c} - \Delta T_{C,c},\ P_{PowerClass} - \text{MAX}(\text{MAX}(MPR_c,\ A\text{-}MPR_c) + \Delta T_{IB,c} + \Delta T_{C,c},\ P\text{-}MPR_c),\ P_{Regulatory,c}\}.$$

-continued $$P_{CMAX\_H,c,SL} = \text{MIN}\{P_{EMAX,c},\ P_{PowerClass},\ P_{Regulatory}\}.$$

An upper bound $P_{CMAX\_H,c,SL}$ is determined by a smallest value in a cell-level power $P_{EMAX,c}$ configured on the network, a transmitted power class $P_{PowerClass}$ reported by the UE, and a regulatory restriction $P_{Regulatory}$ in some scenarios. A lower bound $P_{CMAX\_H,c,SL}$ is mainly determined by the transmitted power class $P_{PowerClass}$ reported by the UE and maximum power reductions $MPR_c$ and A-$MPR_c$. Generally, only the maximum power reduction $MPR_c$ may be considered herein. In other words, the UE determines the lower bound based on MAX($MPR_c$, A-$MPR_c$) corresponding to the sidelink transmission. The MAX($MPR_c$, A-$MPR_c$) herein may alternatively be replaced with the $MPR_c$.

For example, for a value of the $MPR_c$, refer to Table 1. Table 1 shows the MPR when the power class is 3. QAM is quadrature amplitude modulation, and QPSK is quadrature phase shift keying. CP-OFDM is cyclic prefix orthogonal frequency division multiplexing.

In a possible implementation 3, the UE determines that Uu air interface communication is in the inactive state.

The possible implementation 3 may be classified into two possible cases based on whether the UE supports a PUSCH transmission.

In a possible case 1, the UE does not support the PUSCH transmission. For example, the UE does not support a small data transmission (small data transmission, SDT).

S301: The UE determines whether to perform an uplink transmission and/or a sidelink transmission.

The UE determines that only the sidelink transmission is sent.

S302: The UE determines a configured maximum output power based on a determining result.

For details, refer to S302 in the possible implementation 2.

In a possible case 2, the UE supports the PUSCH transmission. For example, the UE supports a small data transmission (small data transmission, SDT).

S301: The UE determines whether to perform an uplink transmission and/or a sidelink transmission.

The UE determines that the uplink transmission and the sidelink transmission may be sent.

S302: The UE determines a configured maximum output power based on a determining result.

Example 5: The UE can determine that the uplink transmission resource overlaps the sidelink transmission resource in time domain.

For details, refer to Example 1 of the possible case 1 in the possible implementation 1.

Example 6: The UE can determine that the uplink transmission resource does not overlap the sidelink transmission resource in time domain.

For details, refer to Example 2 of the possible case 1 in the possible implementation 1.

Example 7: The UE does not determine or cannot determine whether the uplink transmission resource overlaps the sidelink transmission resource in time domain.

For details, refer to the possible case 2 in the possible implementation 1.

In a sidelink transmission resource configuration case 2, the UE uses the mode 1 on the sidelink. In other words, the SL resource is configured by the network device.

It should be understood that, in this case, the RRC of the UE is in the connected state. For a specific implementation, refer to the possible implementation 1 in the configuration case 1 of the sidelink transmission resource.

In this embodiment of this disclosure, the configured maximum output power for the UE is flexibly determined based on whether the UE performs the uplink transmission and/or the sidelink transmission, and further, when the UE performs the uplink transmission and the sidelink transmission, the configured maximum output power for the UE is flexibly determined based on whether the uplink transmission overlaps the sidelink transmission in time domain. In this way, communication quality of the terminal device can be effectively improved, and a communication success rate can be effectively improved.

The following describes a power determining method 400 provided in this disclosure with reference to FIG. 6.

It should be understood that, when a sidelink transmission resource and an uplink transmission resource correspond to different subcarrier spacings, and UE determines whether the uplink transmission resource overlaps the sidelink transmission resource, one uplink transmission resource may overlap a plurality of sidelink transmission resources, or one sidelink transmission resource may overlap a plurality of uplink transmission resources. The following separately provides descriptions with reference to (a) and (b) in FIG. 6.

As shown in (a) in FIG. 6, in S401*a*, the UE determines that the uplink transmission resource overlaps a plurality of sidelink transmission resources.

The following is an example for how the UE determines that the uplink transmission resource overlaps the plurality of sidelink transmission resources in time domain. UE obtains control information of the plurality of sidelink transmission resources before obtaining control information of the uplink transmission resource. In other words, the UE may determine, based on the control information of the uplink transmission resource and the control information of the plurality of sidelink transmission resources, that the uplink transmission resource overlaps the plurality of sidelink transmission resources in time domain.

S402*a*: The UE separately determines configured maximum output powers corresponding to the uplink transmission resource and the plurality of sidelink transmission resources.

For the uplink transmission resource and each sidelink transmission resource, the UE may separately determine a plurality of configured maximum output powers according to the method described in Example 1 of the possible case 1 in the possible implementation 1 in the method 300.

It should be understood that, in the uplink transmission resource and the plurality of sidelink transmission resources, a length of the uplink transmission resource is the longest, and the plurality of sidelink transmission resources separately overlap the uplink transmission resource in different time domains.

S403*a*: The UE determines a configured maximum output power based on the configured maximum output powers corresponding to the uplink transmission resource and the plurality of sidelink transmission resources.

Then, an upper bound $P_{CMAX\_H}$ and a lower bound $P_{CMAX\_L}$ of the configured maximum output power for the UE are determined based on the plurality of configured maximum output powers, so that a range of the configured maximum output power may be determined. For example, $P_{CMAX\_H}$ may be a largest value in the plurality of configured maximum output powers, and $P_{CMAX\_L}$ may be a smallest value in the plurality of configured maximum output powers. $P_{CMAX\_L} \le P_{CMAX} \le P_{CMAX\_H}$.

As shown in (b) in FIG. 6, in S401*b*, the UE determines that the sidelink transmission resource overlaps a plurality of uplink transmission resources.

S402*b*: The UE separately determines configured maximum output powers corresponding to the sidelink transmission resource and the plurality of uplink transmission resources.

S403*b*: The UE determines a configured maximum output power based on the configured maximum output powers corresponding to the sidelink transmission resource and the plurality of uplink transmission resources.

A specific implementation is similar to S401*a* to S403*a*, and details are not described herein again.

In this embodiment of this disclosure, when one uplink transmission resource overlaps a plurality of sidelink transmission resources, or when one sidelink transmission resource overlaps a plurality of uplink transmission resources, a configured maximum output power is separately determined based on two resources that overlap each other, to determine a range of the configured maximum output power for the UE, so as to determine the configured maximum output power for the UE. This further extends an application range of the power increasing method in this disclosure, so that a manner of determining the configured maximum output power is more flexible, communication quality is further improved, and the communication success rate is further improved.

The methods provided in embodiments of this disclosure are described above in detail with reference to FIG. 1 to FIG. 6. The apparatuses provided in embodiments of this disclosure are described below in detail with reference to FIG. 7 and FIG. 8.

Figure 7:
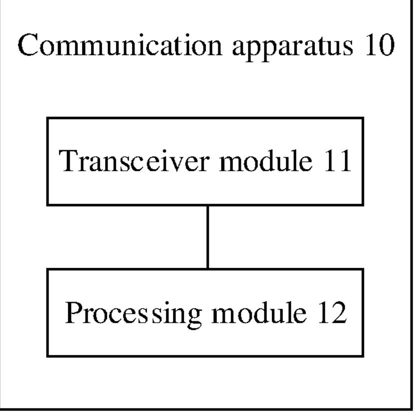
FIG. 7 is a schematic block diagram of a communication apparatus according to an embodiment of this disclosure.

FIG. 7 is a schematic block diagram of a communication apparatus according to an embodiment of this disclosure. As shown in FIG. 7, a communication apparatus 10 may include a transceiver module 11 and a processing module 12.

The transceiver module 11 may be configured to receive information sent by another apparatus, or may be configured to send information to another apparatus. For example, a first quantity is received or a PUSCH is sent. The processing module 12 may be configured to perform content processing of the apparatus, for example, determine a quantity of time units included in a time window.

In a possible design, the communication apparatus 10 may correspond to the terminal device in the foregoing method embodiments.

Specifically, the communication apparatus 10 may correspond to the first apparatus or the UE in any one of the method 100 to the method 400 according to embodiments of this disclosure. The communication apparatus 10 may include a module configured to perform an operation performed by the first apparatus in a corresponding method. In addition, units in the communication apparatus 10 are separately configured to implement operations performed by the first apparatus in the corresponding method.

For example, when the communication apparatus 10 corresponds to the first apparatus in the method 100, the transceiver module 11 is configured to perform step S101, and the processing module 12 is configured to perform S102, S103, and S104.

For example, when the communication apparatus 10 corresponds to the terminal device in the method 200, the transceiver module 11 is configured to perform steps S201 and S202, and the processing module 12 is configured to perform S203 and S204.

For example, when the communication apparatus 10 corresponds to the terminal device in the method 300, the processing module 12 is configured to perform S301 and S302.

For example, when the communication apparatus 10 corresponds to the terminal device in the method 400, the processing module 12 is configured to perform S401*a* to S403*a*, S401*b*, and S402*b*.

Figure 8:
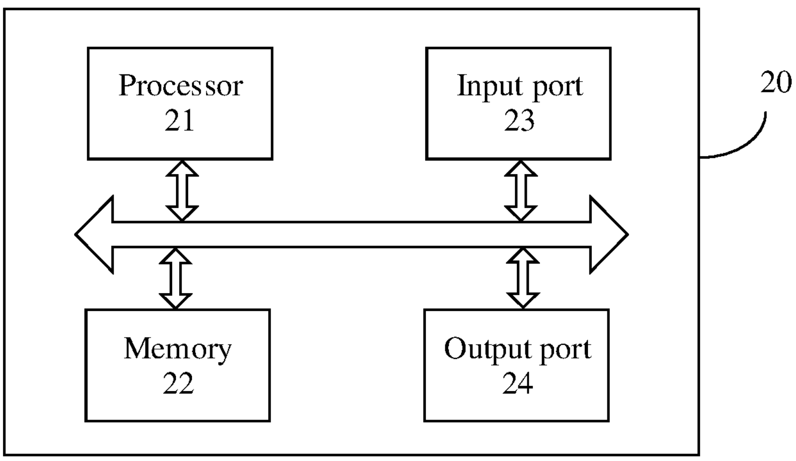
FIG. 8 is a schematic diagram of a communication apparatus 20 according to an embodiment of this disclosure.

FIG. 8 is a schematic diagram of a communication apparatus 20 according to an embodiment of this disclosure.

In a possible design, the communication apparatus 20 may be a terminal device, including various handheld devices having a wireless communication function, a vehicle-mounted device, a wearable device, a computing device, or another processing device connected to a wireless modem, and various forms of terminals, mobile stations, user equipment, soft terminals, or the like, or may be a chip, a chip system, or the like located on a terminal device.

The communication apparatus 20 may include a processor 21 (to be specific, an example of a processing module) and a memory 22. The memory 22 is configured to store instructions. The processor 21 is configured to execute the instructions stored in the memory 22, so that the communication apparatus 20 implements the steps performed by the devices in the foregoing possible designs in the methods corresponding to FIG. 3 to FIG. 6.

Further, the communication apparatus 20 may further include an input port 23 (to be specific, an example of a transceiver module) and an output port 24 (to be specific, another example of the transceiver module). Further, the processor 21, the memory 22, the input port 23, and the output port 24 may communicate with each other through an internal connection path, to transmit a control signal and/or a data signal. The memory 22 is configured to store a computer program. The processor 21 may be configured to invoke the computer program from the memory 22 and run the computer program, to control the input port 23 to receive a signal, and control the output port 24 to send a signal, to complete the steps of the terminal device, the radio access network device, the UE, or the base station in the foregoing methods. The memory 22 may be integrated into the processor 21, or may be disposed separately from the processor 21.

Optionally, if the communication apparatus 20 is a communication device, the input port 23 is a receiver, and the output port 24 is a transmitter. The receiver and the transmitter may be a same physical entity or different physical entities. When the receiver and the transmitter are a same physical entity, the receiver and the transmitter may be collectively referred to as a transceiver.

Optionally, if the communication apparatus 20 is a chip or a circuit, the input port 23 is an input interface, and the output port 24 is an output interface.

In an implementation, it may be considered that functions of the input port 23 and the output port 24 are implemented through a transceiver circuit or a dedicated transceiver chip. It may be considered that the processor 21 is implemented through a dedicated processing chip, a processing circuit, a processor, or a general-purpose chip.

In another implementation, it may be considered that the device provided in embodiments of this disclosure is implemented by using a general-purpose computer. To be specific, program code for implementing functions of the processor 21, the input port 23, and the output port 24 is stored in the memory 22, and a general-purpose processor implements the functions of the processor 21, the input port 23, and the output port 24 by executing the code in the memory 22.

The modules or units in the communication apparatus 20 may be configured to perform actions or processing processes performed by a random access device (for example, a terminal device) in the foregoing methods. To avoid repetition, detailed descriptions thereof are omitted herein.

For concepts, explanations, detailed descriptions, and other steps of the communication apparatus 20 that are related to the technical solutions provided in embodiments of this disclosure, refer to the descriptions of the content in the methods or other embodiments. Details are not described herein again.

It should be understood that, in embodiments of this disclosure, the processor may be a central processing unit (CPU, central processing unit), or the processor may be another general-purpose processor, a digital signal processor (DSP, digital signal processor), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor, or the like.

An embodiment of this disclosure further provides a computer-readable storage medium. The computer-readable storage medium stores computer instructions used to implement the method performed by the first apparatus or the UE in the foregoing method embodiments.

For example, when the computer program is executed by a computer, the computer can implement the method performed by the first apparatus or the UE in the foregoing method embodiments.

An embodiment of this disclosure further provides a computer-readable storage medium. The computer-readable storage medium stores computer instructions used to implement the method performed by the first apparatus or the UE in the foregoing method embodiments.

For example, when the computer program is executed by a computer, the computer can implement the method performed by the first apparatus or the UE in the foregoing method embodiments.

It should be further understood that the memory in the embodiments of this disclosure may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and used as an external cache. Through example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by using software, hardware, firmware, or any other combination thereof. When the software is used to implement the embodiments, all or some of the foregoing embodiments may be implemented in a form of a computer program product. The computer program product includes one or more computer instructions or computer programs. When the program instructions or the computer programs are loaded and executed on the computer, the procedure or functions according to embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the processes do not mean execution sequences in various embodiments of this disclosure. The execution sequences of the processes need to be determined according to functions and internal logic of the processes, and should not be construed as any limitation on the implementation processes of embodiments of this disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiments are merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located at one location, or may be distributed on a plurality of network units. Some or all of the units may be selected based on an actual requirement to achieve an objective of the solutions of embodiments.

In addition, functional units in embodiments of this disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods described in embodiments of this disclosure. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, comprising:

receiving first indication information, wherein the first indication information indicates a first uplink transmission resource;

determining whether the first uplink transmission resource overlaps a first sidelink transmission resource in time domain;

when the first uplink transmission resource overlaps the first sidelink transmission resource in time domain, determining a first configured maximum output power based on a first maximum power reduction, wherein the first maximum power reduction is a maximum power reduction corresponding to a con-current mode; and determining a transmitted power for a first uplink transmission and a transmitted power for a first sidelink transmission based on the first configured maximum output power, wherein a sum of the transmitted power for the first uplink transmission and the transmitted power for the first sidelink transmission does not exceed the first configured maximum output power, the first uplink transmission is carried on the first uplink transmission resource, and the first sidelink transmission is carried on the first sidelink transmission resource.

2. The method of claim 1, wherein the method further comprises:

when the first uplink transmission resource does not overlap the first sidelink transmission resource in time domain, determining the first configured maximum output power based on the first maximum power reduction; and determining the transmitted power for the first uplink transmission or the transmitted power for the first sidelink transmission based on the first configured maximum output power, wherein the transmitted power for the first uplink transmission or the transmitted power for the first sidelink transmission does not exceed the first configured maximum output power.

3. The method of claim 1, wherein the method further comprises:

when the first uplink transmission resource does not overlap the first sidelink transmission resource in time domain, performing at least one of the following:

determining a second configured maximum output power based on a second maximum power reduction, wherein the second maximum power reduction is a maximum power reduction corresponding to a carrier on which the first uplink transmission resource is located;

and determining the transmitted power for the first uplink transmission based on the second configured maximum output power, wherein the transmitted power for the first uplink transmission does not exceed the second configured maximum output power; or determining a third configured maximum output power based on a third maximum power reduction, wherein the third maximum power reduction is a maximum power reduction corresponding to a carrier on which the first sidelink transmission resource is located; and determining the transmitted power for the first sidelink transmission based on the third configured maximum output power, wherein the transmitted power for the first sidelink transmission does not exceed the third configured maximum output power.

4. The method of claim 1, wherein when the first uplink transmission resource overlaps the first sidelink transmission resource in time domain, and a priority of the first uplink transmission is higher than a priority of the first sidelink transmission, the determining a transmitted power for a first uplink transmission and a transmitted power for a first sidelink transmission based on the first configured maximum output power comprises:

determining the transmitted power for the first uplink transmission, wherein the transmitted power for the first uplink transmission is a smaller value between the transmitted power for the first uplink transmission and the first configured maximum output power, the transmitted power for the first uplink transmission is determined based on a second maximum power reduction, and the second maximum power reduction is a maximum power reduction corresponding to a carrier on which the first uplink transmission resource is located; and determining the transmitted power for the first sidelink transmission based on the first configured maximum output power and the transmitted power for the first uplink transmission.

5. The method of claim 1, wherein when the first uplink transmission resource overlaps the first sidelink transmission resource in time domain, and a priority of the first sidelink transmission is higher than a priority of the first uplink transmission, the determining a transmitted power for a first uplink transmission and a transmitted power for a first sidelink transmission based on the first configured maximum output power comprises:

determining the transmitted power for the first sidelink transmission, wherein the transmitted power for the first sidelink transmission is a smaller value between the transmitted power for the first sidelink transmission and the first configured maximum output power, the transmitted power for the first sidelink transmission is determined based on a third maximum power reduction, and the third maximum power reduction is a maximum power reduction corresponding to a carrier on which the first sidelink transmission resource is located; and determining the transmitted power for the first uplink transmission based on the first configured maximum output power and the transmitted power for the first sidelink transmission.

6. The method of claim 1, wherein the first maximum power reduction is determined based on the first uplink transmission resource and the first sidelink transmission resource.

7. The method of claim 1, wherein the method further comprises:

receiving second indication information, wherein the second indication information indicates a second uplink transmission resource;

when the second uplink transmission resource overlaps the first sidelink transmission resource in time domain, determining a fourth configured maximum output power based on a fourth maximum power reduction, wherein the fourth maximum power reduction is a maximum power reduction corresponding to the concurrent mode, and the fourth maximum power reduction is determined based on the second uplink transmission resource and the first sidelink transmission resource; and when the fourth configured maximum output power is greater than the first configured maximum output power, determining a transmitted power for a second uplink transmission based on the first configured maximum output power, wherein a sum of the transmitted power for the second uplink transmission and the transmitted power for the first sidelink transmission does not exceed the first configured maximum output power, and the second uplink transmission is carried on the second uplink transmission resource.

8. The method of claim 1, wherein the method further comprises:

determining at least one second sidelink transmission resource;

when the second sidelink transmission resource overlaps the first uplink transmission resource in time domain, determining a fifth configured maximum output power based on a fifth maximum power reduction, wherein the fifth maximum power reduction is a maximum power reduction corresponding to the con-current mode, and the fifth maximum power reduction is determined based on the second sidelink transmission resource and the first uplink transmission resource; and when the fifth configured maximum output power is greater than the first configured maximum output power, determining a transmitted power for a second sidelink transmission based on the first configured maximum output power, wherein a sum of the transmitted power for the second sidelink transmission and the transmitted power for the first uplink transmission does not exceed the first configured maximum output power, and the second sidelink transmission is carried on the second sidelink transmission resource.

9. The method of claim 1, wherein the first uplink transmission resource and the first sidelink transmission resource are located in a same frequency band.

10. An apparatus comprising: at least one processor coupled to at least one memory storing instructions and configured to execute the instructions to cause the apparatus to perform:

receiving first indication information, wherein the first indication information indicates a first uplink transmission resource;

determining whether the first uplink transmission resource overlaps a first sidelink transmission resource in time domain;

when the first uplink transmission resource overlaps the first sidelink transmission resource in time domain, determining a first configured maximum output power based on a first maximum power reduction, wherein the first maximum power reduction is a maximum power reduction corresponding to a con-current mode; and determining a transmitted power for a first uplink transmission and a transmitted power for a first sidelink transmission based on the first configured maximum output power, wherein a sum of the transmitted power for the first uplink transmission and the transmitted power for the first sidelink transmission does not exceed the first configured maximum output power, the first uplink transmission is carried on the first uplink transmission resource, and the first sidelink transmission is carried on the first sidelink transmission resource.

11. The apparatus of claim 10, wherein the at least one processor is configured to execute the instructions to cause the apparatus to perform:

when the first uplink transmission resource does not overlap the first sidelink transmission resource in time domain, performing at least one of the following:

determining a second configured maximum output power based on a second maximum power reduction, wherein the second maximum power reduction is a maximum power reduction corresponding to a carrier on which the first uplink transmission resource is located; and determining the transmitted power for the first uplink transmission based on the second configured maximum output power, wherein the transmitted power for the first uplink transmission does not exceed the second configured maximum output power; or determining a third configured maximum output power based on a third maximum power reduction, wherein the third maximum power reduction is a maximum power reduction corresponding to a carrier on which the first sidelink transmission resource is located; and determining the transmitted power for the first sidelink transmission based on the third configured maximum output power, wherein the transmitted power for the first sidelink transmission does not exceed the third configured maximum output power.

12. The apparatus of claim 10, wherein the first maximum power reduction is determined based on the first uplink transmission resource and the first sidelink transmission resource.

13. The apparatus of claim 10, wherein the at least one processor is configured to execute the instructions to cause the apparatus to perform:

receiving second indication information, wherein the second indication information indicates a second uplink transmission resource;

when the second uplink transmission resource overlaps the first sidelink transmission resource in time domain, determining a fourth configured maximum output power based on a fourth maximum power reduction, wherein the fourth maximum power reduction is a maximum power reduction corresponding to the concurrent mode, and the fourth maximum power reduction is determined based on the second uplink transmission resource and the first sidelink transmission resource; and when the fourth configured maximum output power is greater than the first configured maximum output power, determining a transmitted power for a second uplink transmission based on the first configured maximum output power, wherein a sum of the transmitted power for the second uplink transmission and the transmitted power for the first sidelink transmission does not exceed the first configured maximum output power, and the second uplink transmission is carried on the second uplink transmission resource.

14. The apparatus of claim 10, wherein the first uplink transmission resource and the first sidelink transmission resource are located in a same frequency band.

15. The apparatus of claim 10, wherein the apparatus comprises user equipment or a chip of user equipment.

16. The apparatus of claim 10, wherein the at least one processor is configured to execute the instructions to cause the apparatus to perform:

when the first uplink transmission resource does not overlap the first sidelink transmission resource in time domain, determining the first configured maximum output power based on the first maximum power reduction; and determining the transmitted power for the first uplink transmission or the transmitted power for the first sidelink transmission based on the first configured maximum output power, wherein the transmitted power for the first uplink transmission or the transmitted power for the first sidelink transmission does not exceed the first configured maximum output power.

17. A non-transitory computer-readable storage medium, wherein the computer-readable storage medium stores a computer program, and when the computer program is run on an apparatus, cause the apparatus to perform following operations:

receiving first indication information, wherein the first indication information indicates a first uplink transmission resource;

determining whether the first uplink transmission resource overlaps a first sidelink transmission resource in time domain;

when the first uplink transmission resource overlaps the first sidelink transmission resource in time domain, determining a first configured maximum output power based on a first maximum power reduction, wherein the first maximum power reduction is a maximum power reduction corresponding to a con-current mode; and determining a transmitted power for a first uplink transmission and a transmitted power for a first sidelink transmission based on the first configured maximum output power, wherein a sum of the transmitted power for the first uplink transmission and the transmitted power for the first sidelink transmission does not exceed the first configured maximum output power, the first uplink transmission is carried on the first uplink transmission resource, and the first sidelink transmission is carried on the first sidelink transmission resource.

18. The non-transitory computer-readable storage medium of claim 17, when the operations comprise:

when the first uplink transmission resource does not overlap the first sidelink transmission resource in time domain, performing at least one of the following:

determining a second configured maximum output power based on a second maximum power reduction, wherein the second maximum power reduction is a maximum power reduction corresponding to a carrier on which the first uplink transmission resource is located;

and determining the transmitted power for the first uplink transmission based on the second configured maximum output power, wherein the transmitted power for the first uplink transmission does not exceed the second configured maximum output power; or determining a third configured maximum output power based on a third maximum power reduction, wherein the third maximum power reduction is a maximum power reduction corresponding to a carrier on which the first sidelink transmission resource is located; and determining the transmitted power for the first sidelink transmission based on the third configured maximum output power, wherein the transmitted power for the first sidelink transmission does not exceed the third configured maximum output power.

19. The non-transitory computer-readable storage medium of claim 17, wherein the first maximum power reduction is determined based on the first uplink transmission resource and the first sidelink transmission resource.

20. The non-transitory computer-readable storage medium of claim 17, when the operations comprise:

receiving second indication information, wherein the second indication information indicates a second uplink transmission resource;

when the second uplink transmission resource overlaps the first sidelink transmission resource in time domain, determining a fourth configured maximum output power based on a fourth maximum power reduction, wherein the fourth maximum power reduction is a maximum power reduction corresponding to the concurrent mode, and the fourth maximum power reduction is determined based on the second uplink transmission resource and the first sidelink transmission resource; and when the fourth configured maximum output power is greater than the first configured maximum output power, determining a transmitted power for a second uplink transmission based on the first configured maximum output power, wherein a sum of the transmitted power for the second uplink transmission and the transmitted power for the first sidelink transmission does not exceed the first configured maximum output power, and the second uplink transmission is carried on the second uplink transmission resource.

* * * * *